(12) United States Patent
Eldada

(10) Patent No.: US 7,221,821 B2
(45) Date of Patent: May 22, 2007

(54) HITLESS ERRORLESS TRIMMABLE DYNAMIC OPTICAL ADD/DROP MULTIPLEXER DEVICES

(75) Inventor: Louay Eldada, Lexington, MA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/100,777

(22) Filed: Apr. 7, 2005

(65) Prior Publication Data

US 2005/0175278 A1 Aug. 11, 2005

Related U.S. Application Data

(63) Continuation of application No. 10/075,138, filed on Feb. 14, 2002, now abandoned.

(60) Provisional application No. 60/274,976, filed on Mar. 12, 2001.

(51) Int. Cl.
*G02B 6/28* (2006.01)

(52) U.S. Cl. .......................................... 385/24; 385/37

(58) Field of Classification Search ................ 385/24, 385/27
See application file for complete search history.

(56) References Cited

U.S. PATENT DOCUMENTS

| | | | | |
|---|---|---|---|---|
| 5,706,375 A * | 1/1998 | Mihailov et al. | ............... | 385/24 |
| 5,726,785 A * | 3/1998 | Chawki et al. | ............... | 398/84 |
| 5,751,456 A * | 5/1998 | Koonen | ..................... | 398/85 |
| 5,778,118 A * | 7/1998 | Sridhar | ........................ | 385/24 |
| 5,812,709 A * | 9/1998 | Arai et al. | ..................... | 385/16 |
| 5,841,918 A * | 11/1998 | Li | ............................ | 385/24 |
| 5,982,518 A * | 11/1999 | Mizrahi | ....................... | 398/84 |
| 6,035,080 A * | 3/2000 | Henry et al. | ................... | 385/24 |
| 6,091,870 A | 7/2000 | Eldada | | |
| 6,185,023 B1* | 2/2001 | Mizrahi | ......................... | 398/9 |
| 6,212,315 B1* | 4/2001 | Doerr | .......................... | 385/31 |
| 6,233,372 B1* | 5/2001 | Nakaya | ........................ | 385/11 |
| 6,310,994 B1* | 10/2001 | Jones et al. | ................... | 385/24 |
| 6,320,539 B1* | 11/2001 | Matthews et al. | .......... | 342/375 |
| 6,330,254 B1* | 12/2001 | Hung | .......................... | 372/20 |
| 6,560,386 B2* | 5/2003 | Eldada et al. | ................. | 385/37 |
| 6,738,543 B1* | 5/2004 | Beeson et al. | ................. | 385/27 |
| 6,928,208 B2* | 8/2005 | Deacon et al. | ................ | 385/16 |
| 2002/0015549 A1* | 2/2002 | Pan et al. | ...................... | 385/15 |
| 2002/0196495 A1* | 12/2002 | Grasso et al. | ............... | 359/127 |
| 2005/0147348 A1* | 7/2005 | Grunnet-Jepsen et al. | .... | 385/37 |

FOREIGN PATENT DOCUMENTS

WO WO 99/42893 8/1999

OTHER PUBLICATIONS

C.K. Madsen et. al, Hitless Reconfigurable Add/Drop Multiplexers Using Bragg Gratings in Planar Waveguides. Optical Society of America, 1999, pp. 54-60, vol. 29.

Fenghai Liu et. al, Novel 2X2 Multiwavelength Optical Cross Connects Based on Optical Add/Drop Multiplexers, IEEE Photonics Technology Letters, 2000, pp. 1246-1248, vol. 9.

* cited by examiner

*Primary Examiner*—Ellen E. Kim

(57) ABSTRACT

The present invention is generally directed to integrated optical add/drop multiplexer devices in which light of a specific wavelength (or specific wavelengths) can be added to or dropped from a main fiber optic line. An actuation mechanism (e.g., heat) is used to tune and/or trim the devices. Some proposed architectures provide for tuning of the adding and dropping of channels in a hitless manner, a manner that is non-disruptive to other wavelength channels.

11 Claims, 18 Drawing Sheets

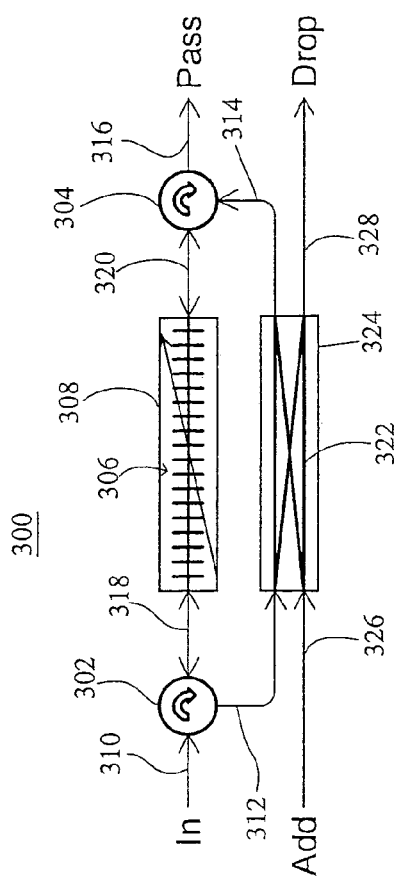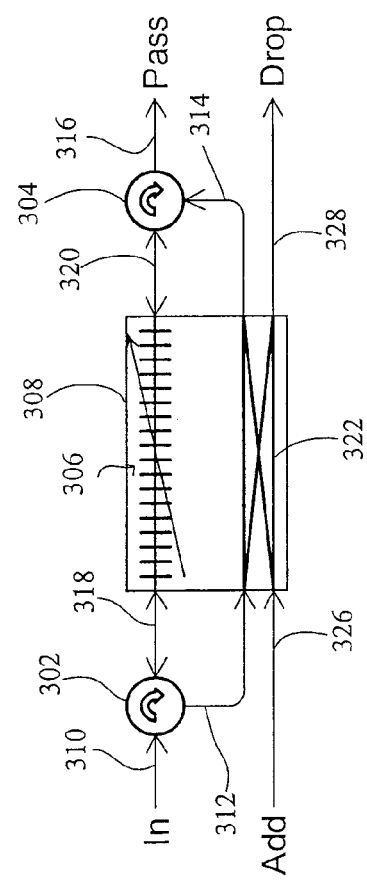
Figure 3a
Figure 3b

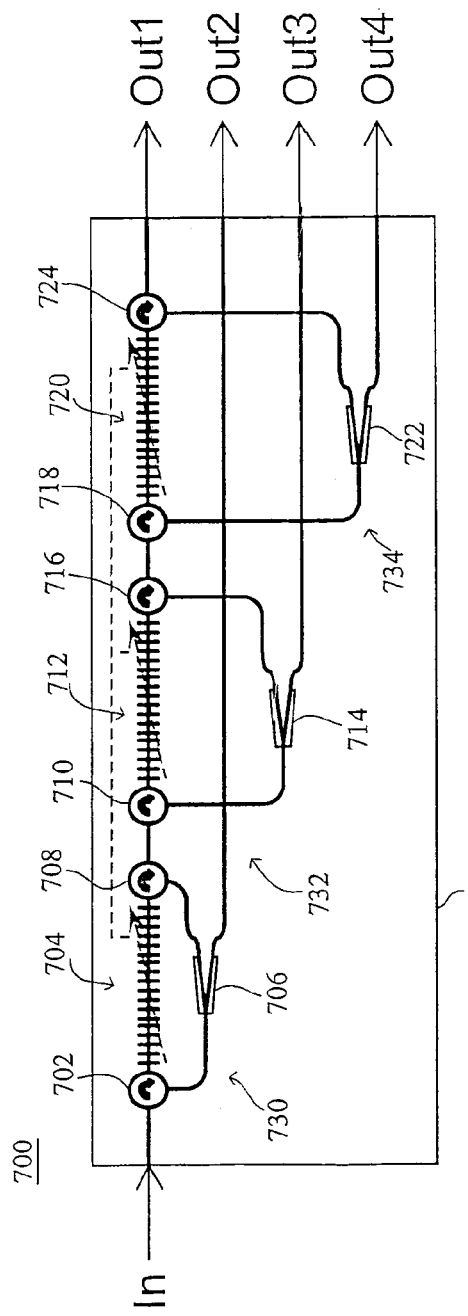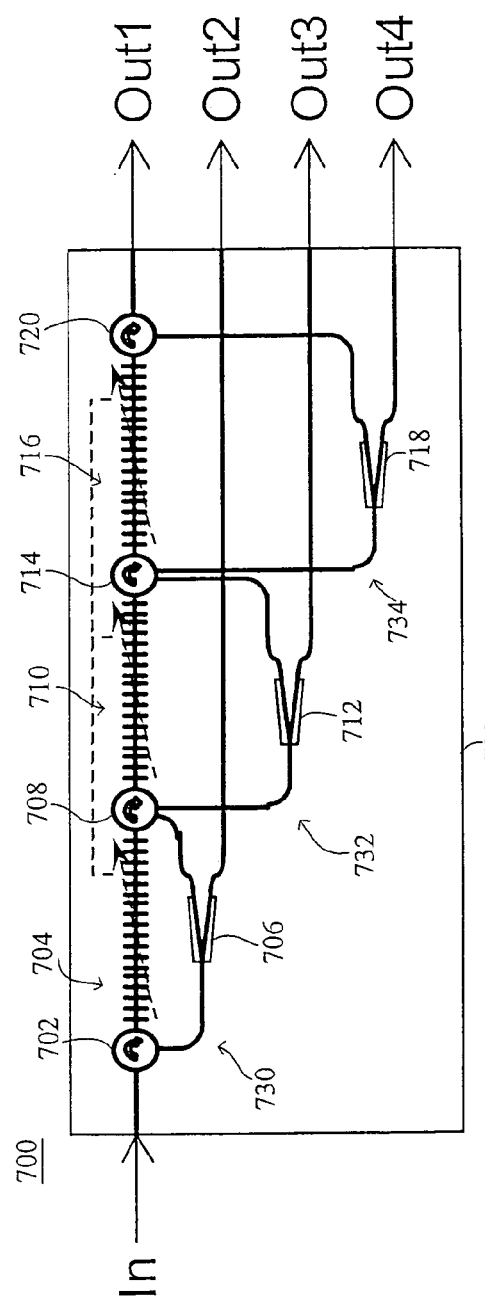

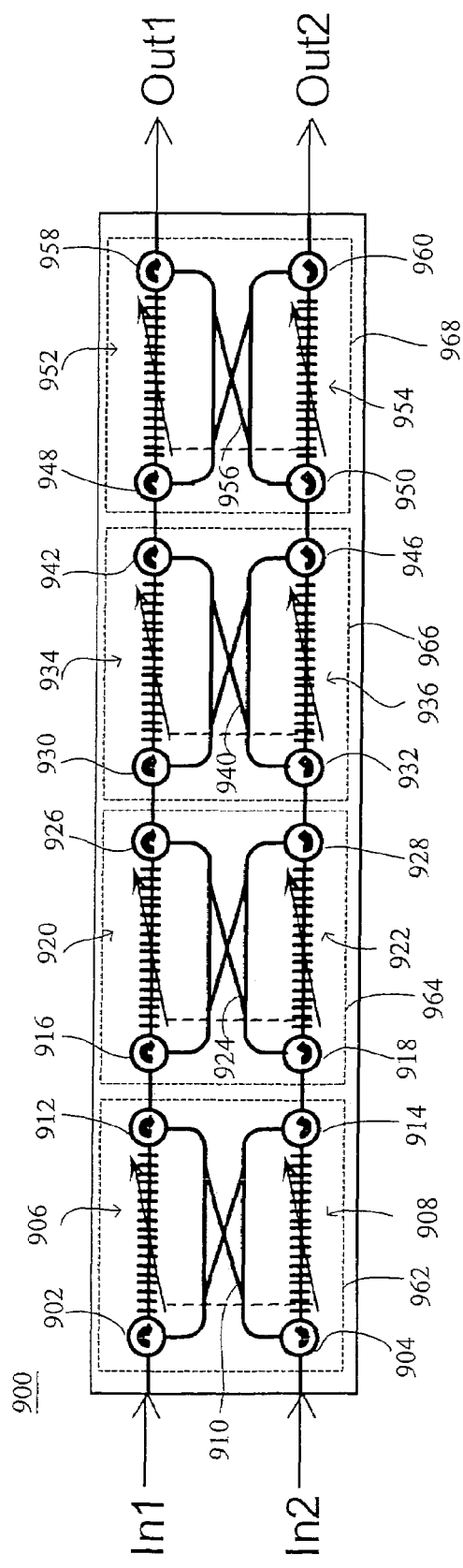
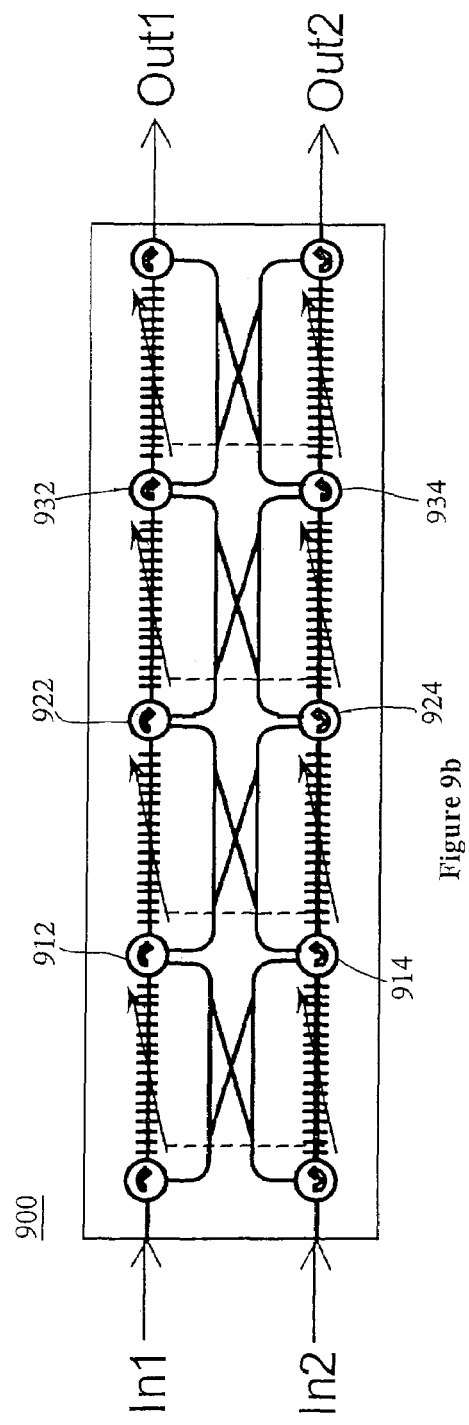
Figure 9a
Figure 9b

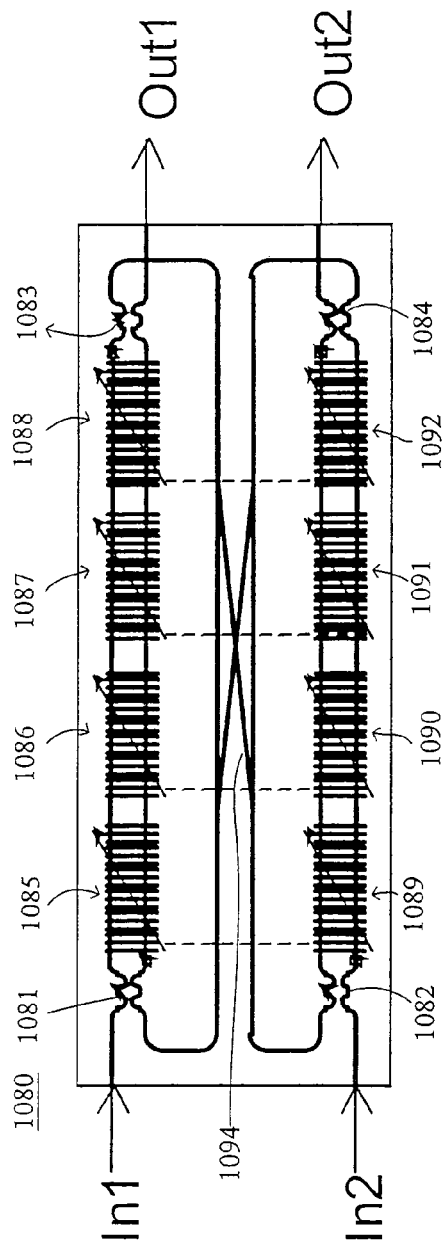
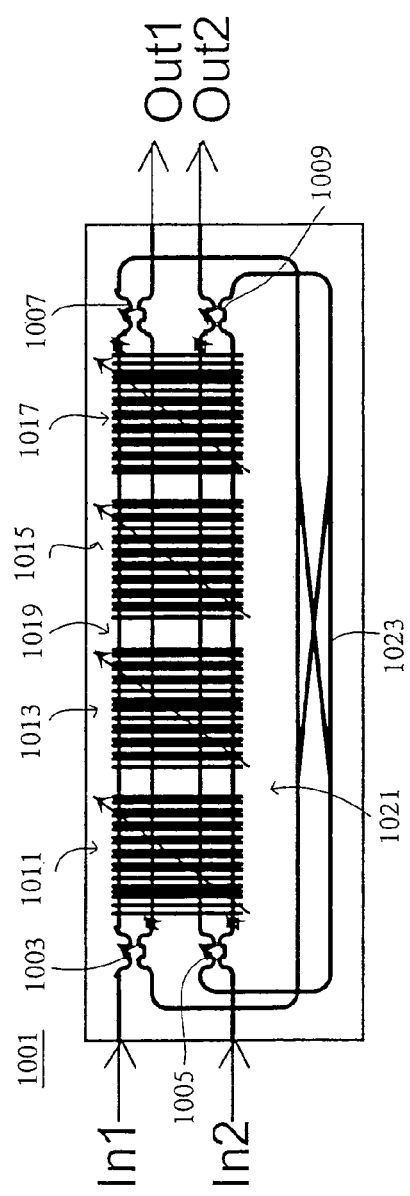

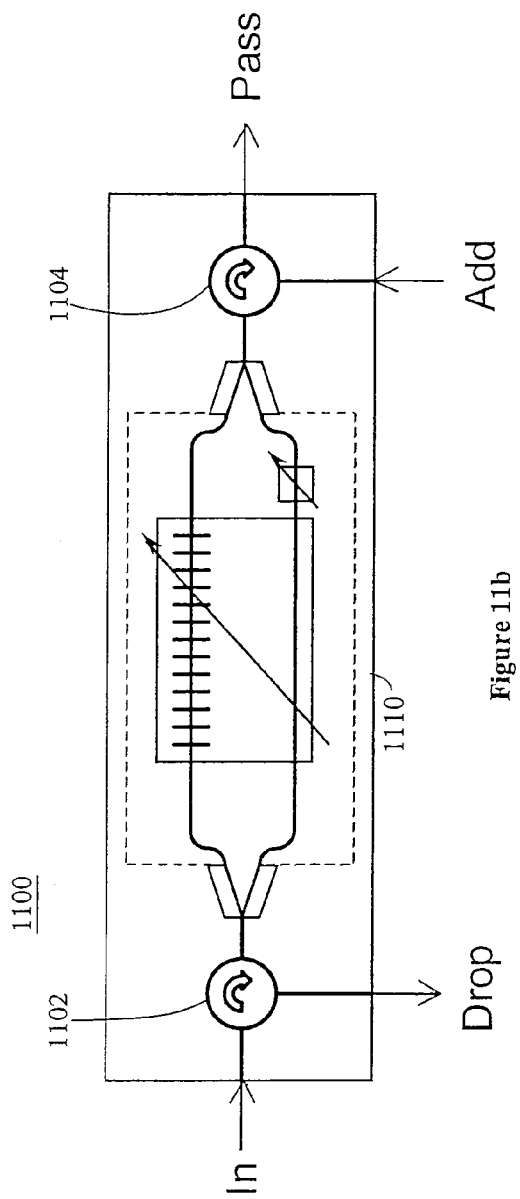
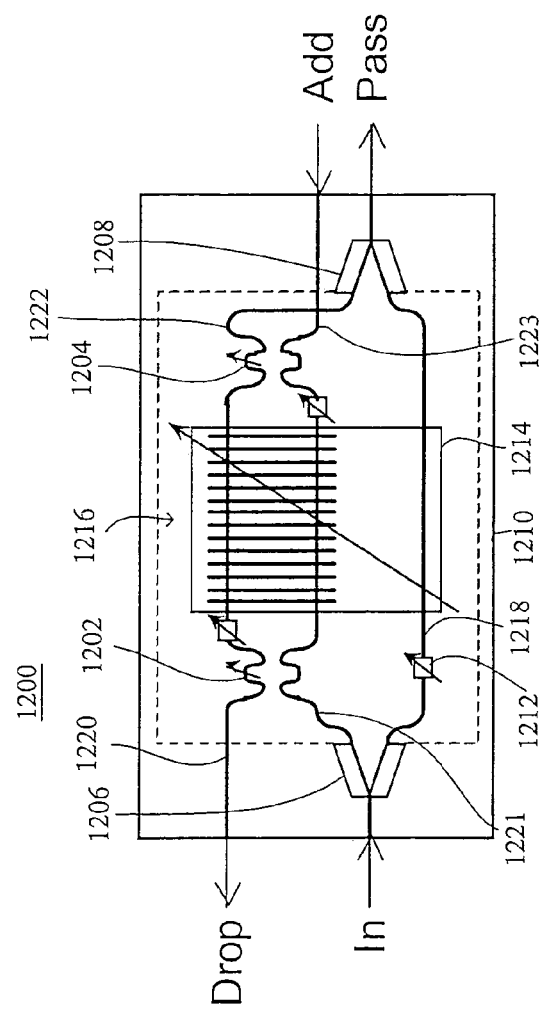
Figure 11b
Figure 12a

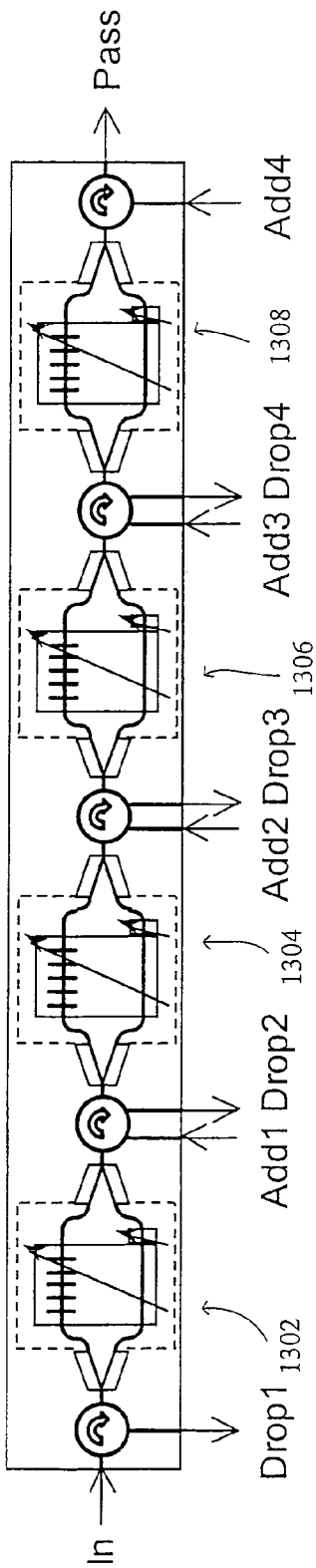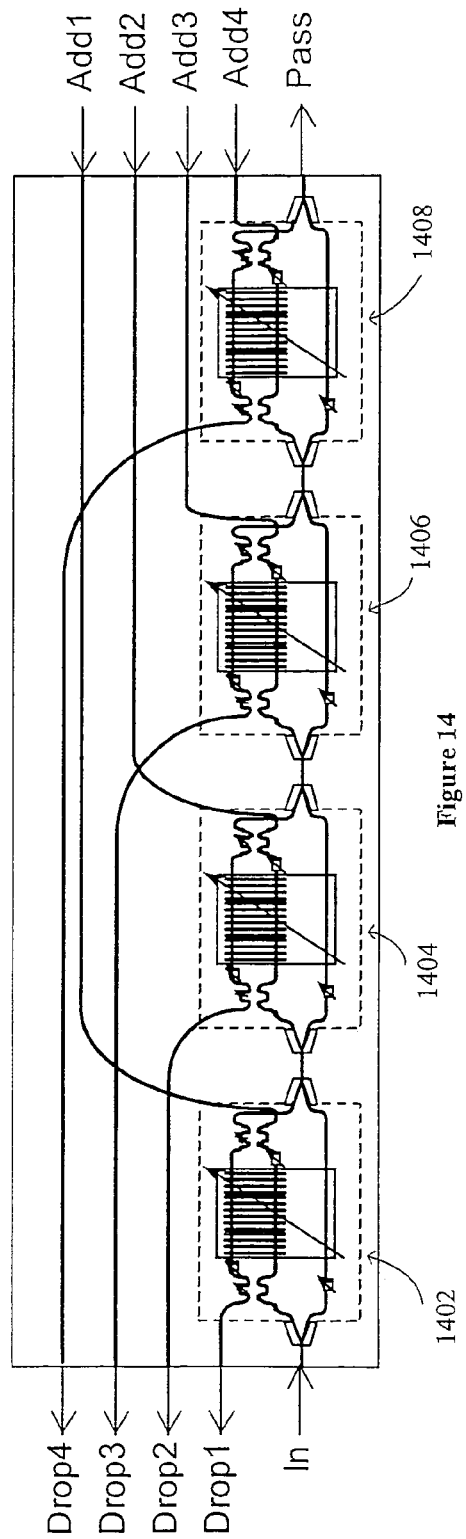
Figure 13b
Figure 14

HITLESS ERRORLESS TRIMMABLE DYNAMIC OPTICAL ADD/DROP MULTIPLEXER DEVICES

PRIORITY INFORMATION

This application claims priority from a continuation of Ser. No. 10/075,138, filed Feb. 14, 2002, is now abandoned, and from provisional application Ser. No. 60/274,976 filed Mar. 12, 2002.

BACKGROUND OF THE INVENTION

The invention relates to the field of optical components.

One method of increasing the transportable bandwidth in optical communications networks is a technique known as wavelength division multiplexing (WDM). WDM is a technology that combines two or more wavelengths of light for transmission along a single optical waveguide. Each wavelength represents a channel that can carry a bit stream, i.e. content. Wavelength and channel are used herein interchangeably. Transporting two or more wavelengths on a waveguide effectively increases the aggregate bandwidth of the waveguide. For example, if 40 wavelengths, each capable of 10 Gb/s are used on a single fiber, the aggregate bandwidth of the fiber becomes 400 Gb/s.

A similar manner of increasing transportable bandwidth has been termed dense wavelength division multiplexing (DWDM). DWDM generally involves combining a larger number of wavelengths onto a fiber than WDM. While DWDM deals with more difficult issues associated with multiplexing a larger number of wavelengths on a fiber, such as cross-talk and non-linear effects, WDM and DWDM are typically used interchangeably.

A number of optical components are used in WDM networks, such as optical multiplexers (MUX), optical demultiplexers (DEMUX), optical add/drop multiplexers (OADM), wavelength selective switches (WSS) and optical cross connects (OXC). A MUX takes different channels from different waveguides and combines them as a WDM signal into one waveguide. A DEMUX divides a WDM signal received from a waveguide into its different channels and couples each channel into a different waveguide. An OADM selectively removes a subset of the total channels from a WDM signal and selectively adds in the same subset of the total channels with different content. A WSS selectively switches the contents of a subset of the total channels between WDM signals, i.e. amongst L WDM signals that have N channels, the contents of any M of the N channels are selectively switched. An OXC performs the same function as a WSS, except that all N channels are switchable, i.e. amongst L WDM signals that have N channels, the contents of the N channels can be selectively switched.

When one of these optical components can be tuned to operate on different channels by software control, or otherwise, it is generally referred to as being dynamic. If a dynamic optical component can be tuned from operating on a source channel (e.g., channel A) to operating on a destination channel (e.g., channel C) without dropping, switching or otherwise removing intermediate channels (e.g., channel B) from the WDM signal, the component is generally referred to as being hitless. Further, if the bit-error-rate (BER) of intermediate channels is not significantly affected during tuning, then the optical component is generally referred to as being errorless. Lastly, if the optical component contains trimmable elements that allow the component to be fine-tuned for optimal operation, then it is generally referred to as being trimmable.

SUMMARY OF THE INVENTION

One aspect of the present invention provides a dynamic optical add/drop multiplexer comprising a first optical circulator, a second optical circulator and a tunable reflective filter formed on a single substrate. The first optical circulator has a first port to receive a multiple wavelength optical signal, a second port to output the received multiple wavelength optical signal, and a third port. The tunable reflective filter is connected to the second port of the first circulator to receive the optical signal. The filter segregates a tuned wavelength from the optical signal and reflects the tuned wavelength back to the first circulator, which outputs the tuned wavelength via the third port. The second optical circulator has a first port to receive the optical signal from the filter, a second port to receive an add optical signal comprising the same wavelength as the tuned wavelength, and a third port to output the multiple wavelength optical signal and the add optical signal.

Another aspect of the present invention provides a trimmable Mach-Zehnder Interferometer (MZI) based dynamic optical add/drop multiplexer. The multiplexer has a first optical path with a tunable reflective filter formed therein and a second optical path having a tunable reflective filter formed therein. The first optical path has a first phase shifter associated with it. The second optical path has a second phase shifter associated with the second optical path. A first 3 dB coupler has a first port to receive a multiple wavelength optical signal and substantially evenly splits the signal into the first optical path and the second optical path. The tunable reflective filters of the first and second paths segregate a tuned wavelength from the split optical signal and reflect the tuned wavelength back to the first 3 dB coupler, which outputs the tuned wavelength via a second port. A second 3 dB coupler receives the split optical signal from the first and second optical paths and combines the split signal into a single signal that outputs via a first port. The second 3 dB coupler also has a second port to receive an add optical signal comprising the same wavelength as the tuned wavelength wherein the add optical signal is additionally output via the first port. The phase shifters balance the optical lengths of the first and second optical path.

Another aspect of the present invention provides an optical device comprising a first directive coupler, a tunable reflective filter, a second directive coupler and a switch. The first directive coupler has a first port to receive a multiple wavelength optical signal, a second port to output the received multiple wavelength optical signal, and a third port. The tunable reflective filter is connected to the second port of the first directive coupler to receive the optical signal. The filter segregates a tuned wavelength from the optical signal and reflects the tuned wavelength back to the first directive coupler, which outputs the tuned wavelength via the third port. The second directive coupler has a first port to receive the optical signal from the filter, a second port to output the multiple wavelength optical signal, and a third port. Any optical signals that input the third port, output the first port. The switch has an input port connected to the third port of the first directive coupler to receive the tuned wavelength, a first output port connected to the third port of the second directive coupler, and a second output port. The switch in a first state causes the tuned wavelength to be output to the third port of the second directive coupler via the first output port of the switch. The switch in a second state causes the tuned wavelength to be output via the second output port of the switch.

Another aspect of the present invention provides an optical device comprising first, second, third and fourth directive couplers and a cross bar switch. The first and second directive couplers have at least one tunable reflective filter connected therebetween. The first directive coupler has a first port to receive a multiple wavelength optical signal, a second port to output the received multiple wavelength optical signal to the at least on filter, and a third port. The filter segregates a tuned wavelength from the optical signal and reflects the tuned wavelength back to the first directive coupler, which outputs the tuned wavelength via the third port. The second directive coupler has a first port to receive the optical signal from the filter, a second port to output the multiple wavelength optical signal, and a third port, wherein any optical signals that input the third, output the first port. Similarly the third and fourth directive couplers have at least one tunable reflective filter connected therebetween. The third directive coupler has a first port to receive a multiple wavelength optical signal, a second port to output the received multiple wavelength optical signal to the at least on filter, and a third port. The filter segregates at least one tuned wavelength from the optical signal and reflects the tuned wavelength back to the third directive coupler, which outputs the tuned wavelength via the third port. The fourth directive coupler having a first port to receive the optical signal from the filter, a second port to output the multiple wavelength optical signal, and a third port, wherein any optical signals that input the third port, output the first port. The cross bar switch in a first state connects the third port of the first directive coupler to the third port of the fourth directive coupler and connects the third port of the third directive coupler to the third port of the second directive coupler. In a second state, the cross bar switch connects the third port of the first directive coupler to the third port of the second directive coupler and connects the third port of the third directive coupler to the third port of the fourth directive coupler.

Another aspect of the present invention provides a hitless errorless dynamic optical add/drop multiplexer. A first optical circulator has a first port to receive a multiple wavelength optical signal, a second port to output the received multiple wavelength optical signal, and a third port. A first switch has an input port, a first output port, and a second output, the input port is connected to the second port of the first circulator. A filter path comprising a tunable reflective filter is connected to the first output port of the first switch. A bypass path is connected to the second output port of the first switch. A second switch has a first input port connected to the filter path, a second input port connected to the bypass path, and an output port. In a first state, the first and second switch cause the optical signal to be directed along the filter path wherein the reflective filter segregates a tuned wavelength from the optical signal and reflects the tuned wavelength back to the first circulator, which outputs the tuned wavelength via the third port. In a second state, the first and second switch cause the optical signal to be directed along the bypass path which leaves the optical signal substantially unaffected. A second optical circulator has a first port connected to the output port of the second switch to receive the optical signal from the second switch, a second port to output the optical signal and a third port to receive an add optical signal, the add optical signal comprising the same wavelength as the tuned wavelength. The add optical signal is output to the second port of the second optical circulator with the optical signal.

Another aspect of the present invention provides a hitless errorless dynamic optical add/drop multiplexer. A first optical path has a tunable reflective filter formed therein and a second optical path has a tunable reflective filter formed therein. A first switch has an input port to receive a multiple wavelength optical signal, a first output port to output the optical signal when the first switch is in a first state, and a second output port to output the optical signal when the first switch is in a second state. A first 3 dB coupler has a first port connected to the second output port of the first switch to receive the multiple wavelength optical signal and substantially evenly split the signal into the first optical path and the second optical path. The tunable reflective filters of the first and second paths segregate a tuned wavelength from the split optical signal and reflect the tuned wavelength back to the first 3 dB coupler, which outputs the tuned wavelength via a second port. A second 3 dB coupler receives the split optical signal from the first and second optical paths and combines the split signal into a single signal that outputs a first port. The second 3 dB coupler has a second port to receive an add optical signal comprising the same wavelength as the tuned wavelength. The add optical signal is additionally output to the first port. A second switch has a first input port connected to the first port of the second 3 dB coupler to receive the optical signals, a second input port connected to the second output port of the first switch, and an output port to output optical signals from the second 3 dB coupler when the second switch is in a first state and to output optical signals from the bypass optical path when the second switch is in a second state.

BRIEF DESCRIPTION OF THE DRAWINGS

FIGS. 3a–c and 4a–b illustrate single-channel hitless dynamic optical add/drop multiplexers according to the principles of the present invention.

FIGS. 7a–b and 8 illustrate hitless dynamic demultiplexers according to the present invention.

FIGS. 9a–9c and 10a–10c illustrate M-channel Hitless Dynamic wavelength selective switches according to the principles of the present invention.

FIGS. 11a–b and 12a–b illustrate single-channel errorless hitless dynamic optical add/drop multiplexers according to the present invention.

FIGS. 13a–b and 14 illustrate multi-channel errorless hitless dynamic demultiplexers according to the present invention.

DETAILED DESCRIPTION OF THE INVENTION

FIGS. 1 and 2a–c illustrate single-channel dynamic optical OADMs according to the principles of the present invention. As previously described, generally a dynamic OADM can be selectively tuned to remove a wavelength from a WDM signal and add in the same wavelength with different content.

Figure 1:
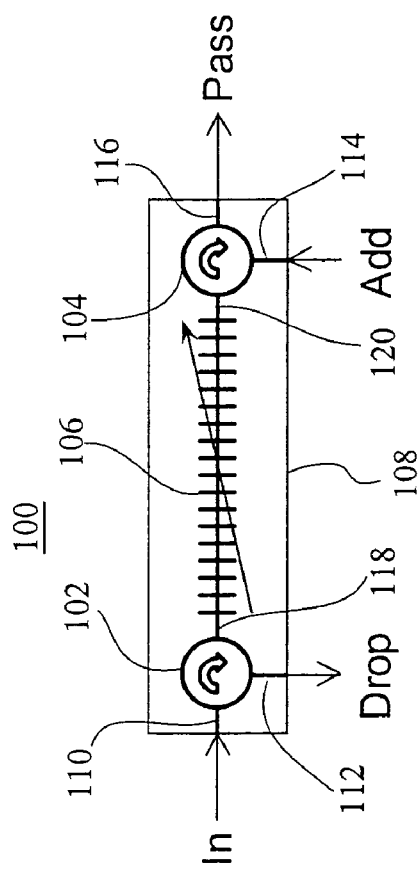
FIGS. 1 and 2a–c illustrate single-channel dynamic optical OADMs according to the principles of the present invention.

FIG. 1 illustrates a dynamic OADM 100 of the present invention comprising a tunable reflective filter 106 and 3-port optical circulators 102 and 104 integrated on the same substrate 108. Tunable reflective filter 106 is, for example, a tunable Bragg grating. Integrated circulators 102 and 104 are based, for example, on planar MZIs using either polarization splitting and nonreciprocal polarization conversion, or nonreciprocal phase shift within the interferometric arms.

Filter 106 has one end connected to the third port 118 of circulator 102 and its other end connected to the first port 120 of circulator 104. First port 110 of circulator 102 is the In port of dynamic OADM 100, while third port 116 of circulator 104 is the Pass port. The second port 112 of circulator 102 and the second port 114 of circulator 104 are, respectively, the Drop port and the Add port of dynamic OADM 100.

During operation, a WDM signal comprising a plurality of channels (e.g., channel A, B, C and D) is input via the In port 110 of OADM 100. Circulator 102 outputs this signal via its third port 118 to filter 106. Filter 106 reflects the channel to which it is tuned (e.g., channel A) back to circulator 102, while allowing the rest of the channels (e.g., B, C and D) to pass through. Circulator 102 outputs the reflected channel out Drop port 112. The channels that are passed through are input to circulator 104 via its first port 120 and, consequently, exit out of Pass port 116.

For each setting of tunable filter 106, the same channel as the one dropped, except with different content (e.g., A'), can be added by inputting it into Add port 114. The added channel is directed by circulator 104 out its first port 120 to filter 106. Because the added channel is the same one that filter 106 is tuned to, filter 106 reflects it back to the first port 120 of circulator 104. Circulator 104 then outputs it out Pass port 116 such that a WDM signal comprising the passed through channels and the added channel (e.g., channels A', B, C and D) is output via Pass port 116.

Figure 2A:
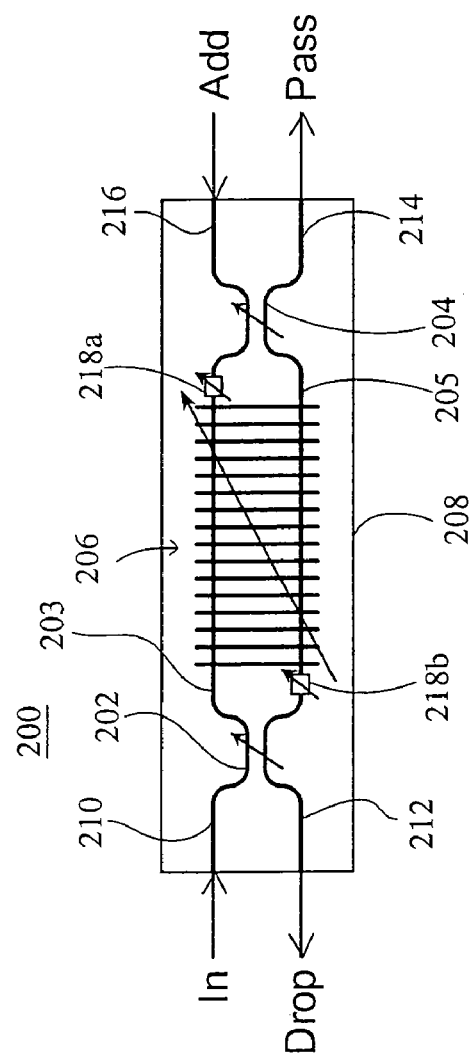

FIG. 2a illustrates a dynamic OADM 200 of the present invention based on a trimmable MZI configuration. The MZI configuration has two optical paths 203 and 205 with tunable filters 206 (e.g., Bragg gratings) formed in them. While a filter can be formed separately in each arm, filters 206 are preferably formed from a single Bragg grating that spans both paths 203 and 205. The tuning of filters 206 to operate on different channels (e.g., by heating for thermo-optical tuning) is preferably done with a single element (e.g., a single thin film heater) that tunes them simultaneously. The MZI configuration is made trimmable by phase shifters 218a and 218b (e.g., thin film heaters), which are associated with optical paths 203 and 205 so that their optical lengths can be adjusted to insure they are balanced. Optical paths 203 and 205 are connected between two 3 dB directional couplers 202 and 204. The arms of 3 dB directional couplers 202 and 204 can be symmetric or asymmetric in width, however, the asymmetric design enables a wavelength-flattened response.

During operation, a WDM signal comprising a plurality of channels (e.g., channel A, B, C and D) is input via the In port of dynamic OADM 200, i.e. first input 210 of coupler 202. Coupler 202 splits the input power of the WDM signal substantially evenly into optical paths 203 and 205. The Bragg gratings in optical paths 203 and 205 reflect the channel they are tuned to (e.g., channel A) back into coupler 202, while allowing the rest of the channels (e.g., B, C and D) to be transmitted through. The optical signal carrying the transmitted channels merges in second coupler 204. When optical paths 203 and 205 are balanced, the optical signal of the transmitted channels is transferred to a first port 214 of second coupler 204 (i.e., the Pass port), with little signal being transmitted to a second port 216 of second coupler 204.

Similar to the transmitted signal, the optical signal of the reflected channel merges in first coupler 202. Like the transmitted channels, when paths 203 and 205 are balanced, the optical signal of the reflected channel is carried out a second port 212 of first coupler 202 (i.e. the Drop port) with little leakage to first port 210 of first coupler 202.

The same channel as the one dropped, except with different content (e.g., A'), can be added by inputting it into Add port 216 of coupler 204. Coupler 204 splits the input power of the added channel evenly into optical paths 203 and 205. The Bragg gratings in optical paths 203 and 205 reflect the added channel back into coupler 204, which transfers the optical signal of the added channel to Pass port 216. As a result, a WDM signal comprising the passed through channels and the added channel (e.g., channels A', B, C and D) is output via Pass port 214.

Figure 2B:
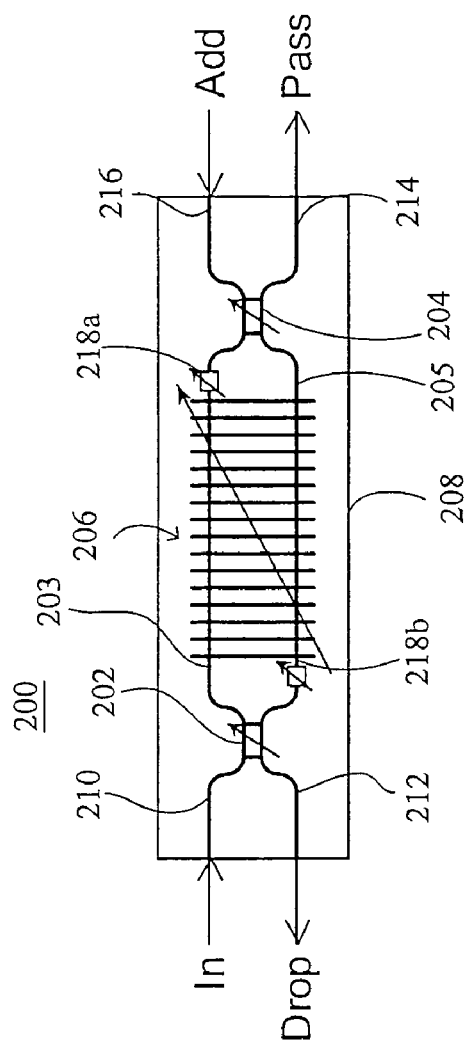
Figure 2C:
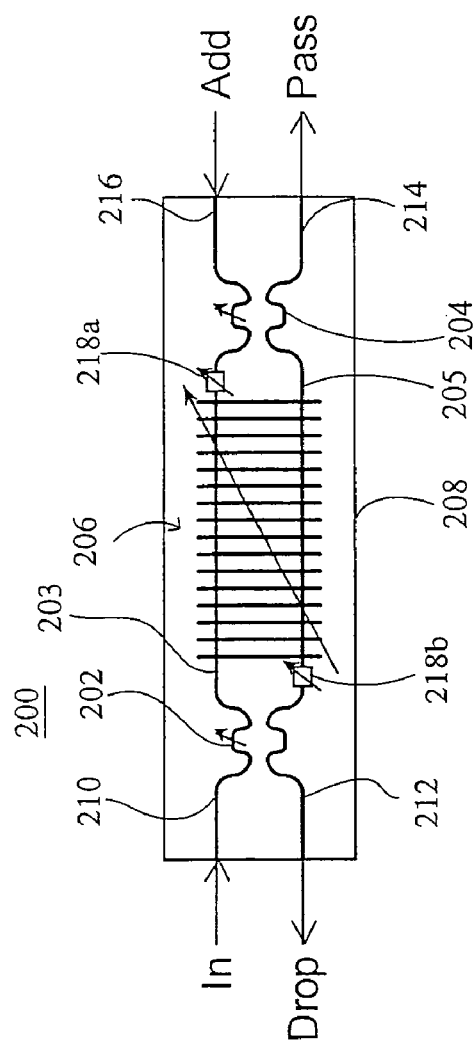

As illustrated in FIG. 2b, the use of 3 dB couplers 202 and 204 based on Multimode Interference (MMI) couplers in place of directional couplers is within the scope of the present invention. Similarly, as illustrated in FIG. 2c, the use of 3 dB couplers 202 and 204 based on MZI couplers in place of directional couplers is within the scope of the present invention. MZI couplers can be symmetric or asymmetric in arm length, however, the asymmetric design enables a wavelength-flattened response.

FIGS. 3a–c and 4a–b illustrate single-channel HDOADMs (SHDOADMs) according to the principles of the present invention. As previously described, generally a hitless dynamic OADM can be selectively tuned to remove a wavelength from a WDM signal and add in the same wavelength with different content without effecting any intermediate wavelengths during tuning.

FIG. 3a illustrates one embodiment of SHDOADM 300 according to the principles of the present invention. SHDOADM 300 comprises a tunable reflective filter 306, such as a tunable Bragg grating, on a substrate 308, a first directive coupler 302, such as a 3-port optical circulator, a second directive coupler 304, such as a 3-port optical circulator, and a cross-bar switch 322 on a substrate 324. Filter 306 has one end connected to the third port 318 of circulator 302 and its other end connected to the first port 320 of circulator 304. First port 310 of circulator 302 is the In port of SHDOADM 300, while third port 316 of circulator 304 is the Pass port.

The second port 312 of circulator 302 is connected to the second port 314 of circulator 304 through a bar arm of cross-bar switch 322. The input side 326 and output side 328 of the other bar arm of cross-bar switch 322 are respectively the Add port and the Drop port of SHDOADM 300.

During operation, a WDM signal comprising a plurality of channels (e.g., channel A, B, C and D) is input via the In port 310. Circulator 302 outputs this signal via its third port 318 to filter 306. Filter 306 reflects the channel to which it is tuned (e.g., channel A) back to circulator 302, while allowing the rest of the channels (e.g., B, C and D) to pass through. The channels that are passed through are input to circulator 304 via its first port 320 and exit out of Pass port 304.

Circulator 302 outputs the reflected channel to cross-bar switch 322 via its second port 312. When filter 306 is not being tuned, cross-bar switch 322 is operated in the cross state causing the reflected channel to be dropped. The reflected channel is dropped because operation of cross-bar switch 322 in the cross state directs the reflected channel to Drop port 328. Further, when filter 306 is not being tuned, the same channel with different content (e.g., A') can be added by inputting it into Add port 326. The added channel is directed by cross-bar switch 322 to the second port 314 of circulator 304. Circulator 304 directs the added channel out its first port 320 to filter 306. Because the added channel is the same one that filter 306 is tuned to, filter 306 reflects it back to the first port 320 of circulator 304. Circulator 304 then outputs it out Pass port 316 such that a WDM signal comprising the passed through channels and the added channel (e.g., channels A', B, C and D) is output via Pass port 316.

When tunable filter 306 is being tuned between a source channel (e.g., channel A) and a destination channel (e.g., channel D), the adding and dropping is deactivated to avoid dropping intermediate channels (e.g., channels B and C) by switching cross-bar switch 322 to the bar state. By placing cross-bar switch 322 into the bar state, a reflected channel is directed to the second port 314 of circulator 304 rather than Drop port 328. As such, the intermediate channels (e.g., B and C) that are reflected by filter 306 while it is being tuned from one channel to the other are added back into the signal that is output via Pass port 316. This permits the output signal to contain all of the channels (e.g., A, B, C and D) during tuning, i.e. no intermediate channels are dropped during tuning of SHDOADM 300 from operation on one channel to another.

Another embodiment of SHDOADM 300 is illustrated in FIG. 3b. SHDOADM 300 is the same except the tunable reflective filter 306 and the cross-bar switch 322 are integrated on the same substrate 308.

Figure 3C:
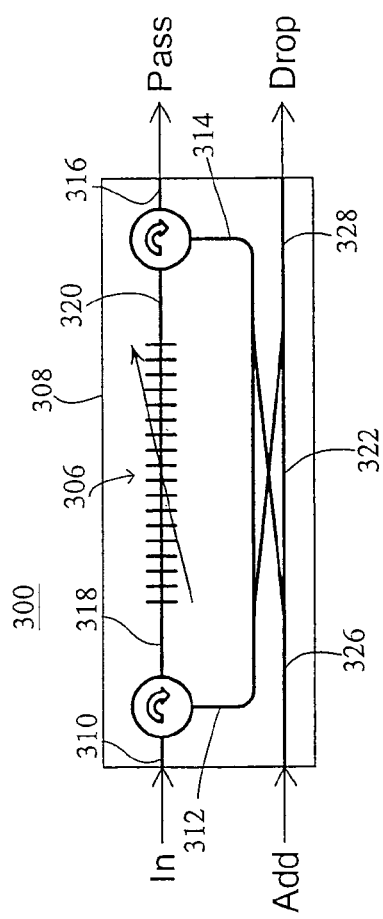

Another embodiment of SHDOADM 300 is illustrated in FIG. 3c. SHDOADM 300 is the same except the tunable reflective filter 306, cross-bar switch 322, and optical circulators 302 and 304 are integrated on the same substrate 308.

Figure 4A:
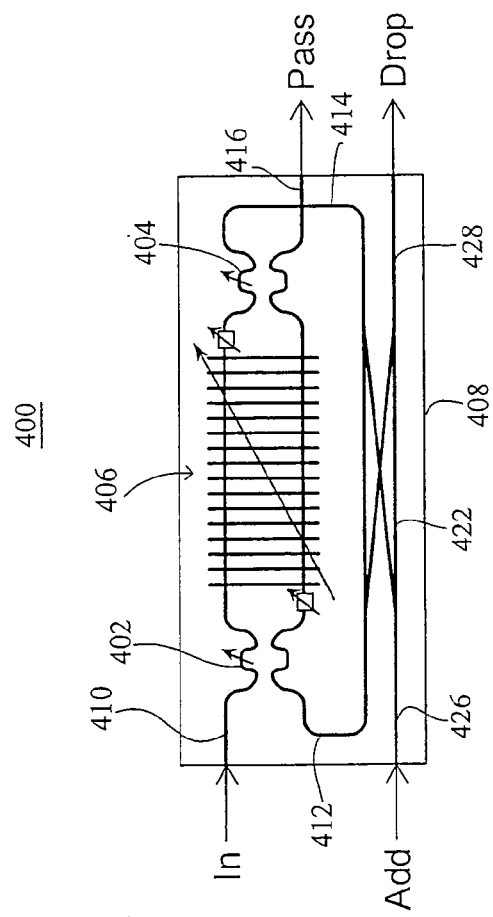

Another embodiment of a SHDOADM 400 is illustrated in FIG. 4a. SHDOADM 400 is similar to SHDOADM 300, except the tunable reflective filter is two optical paths with Bragg gratings formed across them 406 and the two directive couplers are 3 dB couplers 402 and 404 (e.g., MZI coupler, Multimode Interference Coupler, Directional Coupler). The two optical paths with Bragg gratings formed across them 406 and 3 dB couplers 402 and 404 form a balanced MZI structure with substantially identical Bragg gratings in the two MZI arms, i.e. the two optical paths. While preferably formed as a single filter that spans both arms, as one of skill in the art would recognize, the individual Bragg gratings can be formed separately in each arm.

SHDOADM 400 operates similarly to SHDOADM 300. A WDM signal comprising a plurality of channels (e.g., channel A, B, C and D) is input via the In port of SHDOADM 400, i.e. first input 410 of coupler 402. Coupler 402 splits the input power of the WDM signal evenly into the two MZI arms. The Bragg gratings in the two MZI arms reflect the channel to which they are tuned (e.g., channel A) back into coupler 402, while allowing the rest of the channels (e.g., B, C and D) to be transmitted through. The optical signal carrying the transmitted channels merges in second coupler 404. When the optical paths are balanced, the optical signal of the transmitted channels is transferred to a first port 416 of second coupler 404 (i.e., the Pass port), with little signal being transmitted to a second port 414 of second coupler 404. Similarly, the optical signal of the reflected channels merges in first coupler 402. Like the transmitted channels, the optical signal of the reflected channel is carried out a second port 412 of first coupler 402 with little leakage to first port 410 of first coupler 402.

Similar to SHDOADM 300, when the filter 406 is not being tuned, cross-bar switch 422 is operated in the cross state causing the reflected channel to be dropped. The reflected channel is dropped because operation of cross-bar switch 422 in the cross state directs the reflected channel to drop port 428. Further, when filter 406 is not being tuned, the same channel with different content (e.g., A') can be added by inputting it into Add port 426. The added channel is directed by cross-bar switch 422 to the second port 414 of coupler 404. Coupler 404 splits the input power of the added channel evenly into the two MZ arms. The Bragg gratings in the two MZ arms reflect the added channel back into coupler 404. The optical signal of the add channel is transferred to first port 416 of second coupler 404 such that a WDM signal comprising the passed through channels and the added channel (e.g., channels A', B, C and D) is output via Pass port 416.

When filter 406 is being tuned between a source channel (e.g., channel A) and a destination channel (e.g., channel D), the adding and dropping is deactivated to avoid dropping intermediate channels (e.g., channels B and C) by switching cross-bar switch 422 to the bar state. By placing cross-bar switch 422 into the bar state, a reflected channel is directed to the second port 414 of coupler 404 rather than drop port 428. As such, the intermediate channels (e.g., B and C) that are reflected while the filter 406 is being tuned are added back into the signal that is output. This permits the output signal to contain all of the channels (e.g., A, B, C and D) during tuning, i.e. no intermediate channels are dropped during tuning of SHDOADM 400 from operation on one channel to another.

Figure 4B:
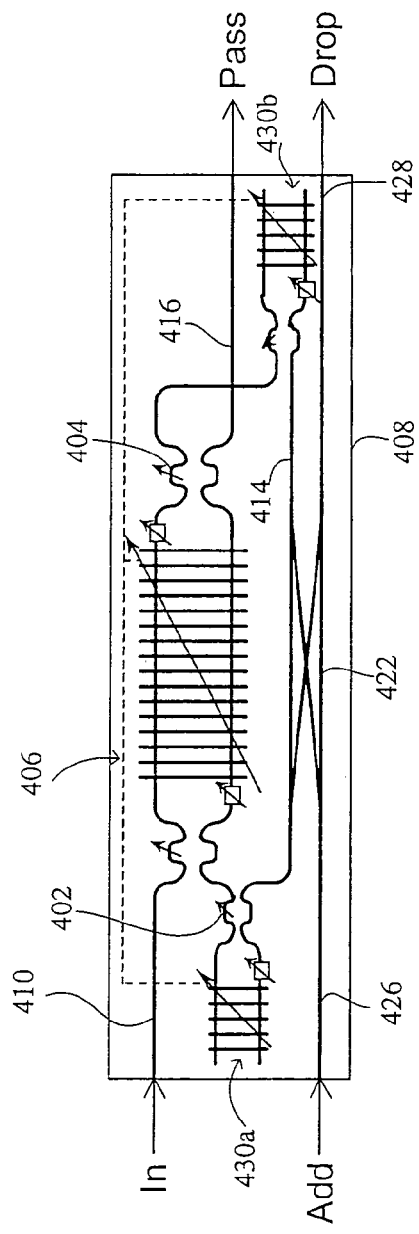

FIG. 4b illustrates another embodiment of a SHDOADM 400. SHDOADM 400 is the same except reflective filters 430a and 430b replace the 180° bends used to connect the second port 414 of coupler 404 to cross-bar switch 422 and to connect the second port 412 of coupler 402 to cross-bar switch 422.

Figure 5A:
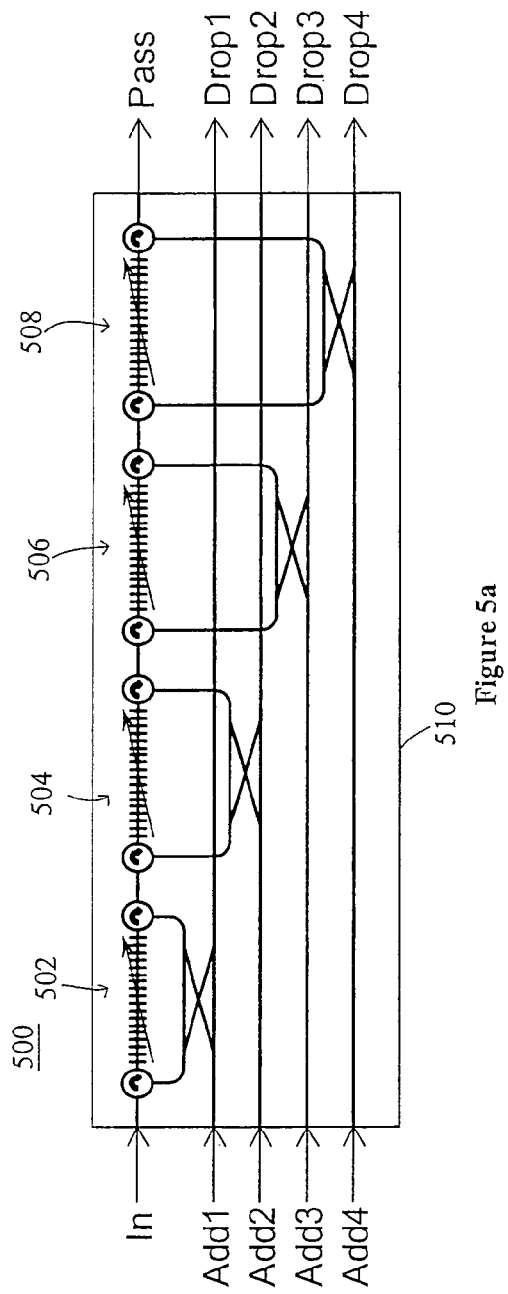
FIGS. 5a–b and 6 illustrate multi-channel hitless dynamic optical add/drop multiplexers according to the principles of the present invention.
Figure 5B:
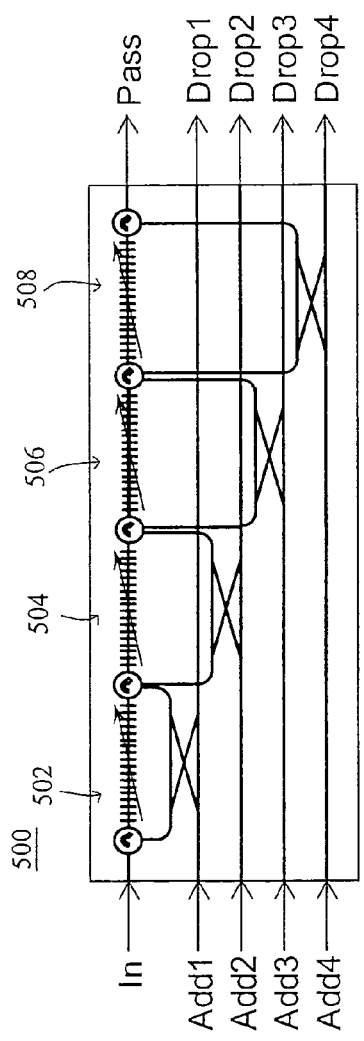
Figure 6:
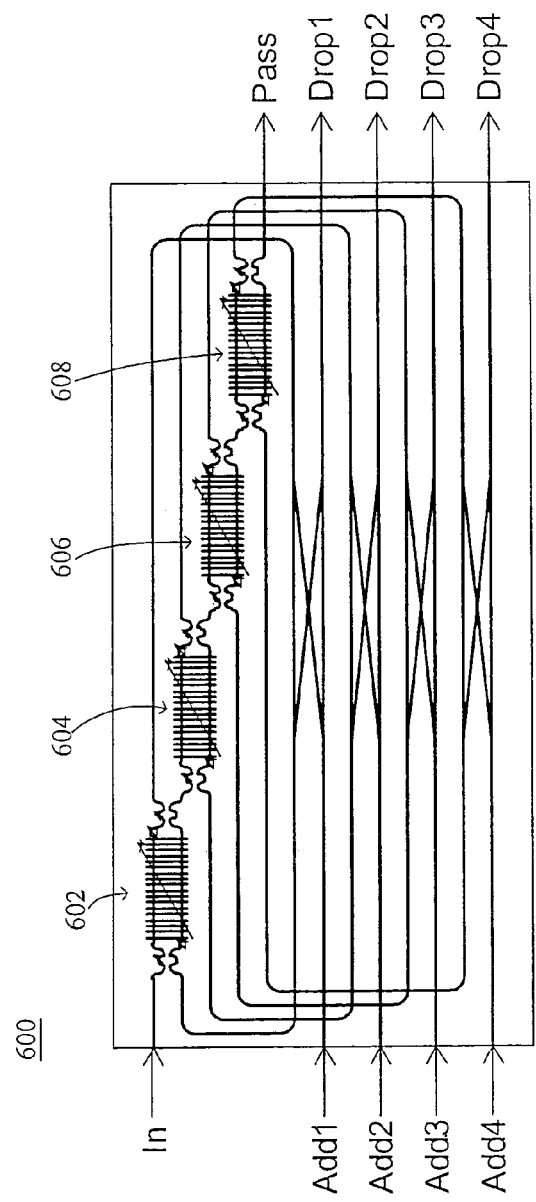

FIGS. 5a–b and 6 illustrate multi-channel hitless dynamic optical add/drop multiplexers formed by a cascade of SHDOADMs according to the present invention. Generally a multi-channel HDOADM selectively removes more than one wavelength from a WDM signal and selectively adds in more than one of the same wavelengths with different content.

FIG. 5a illustrates one embodiment of an exemplary four-channel HDOADM 500 formed by a cascade of SHDOADMs according to the present invention. Four-channel HDOADM is formed by a cascade of SHDOADMs 502, 504, 506 and 508. SHDOAMs 502, 504, 506 and 508 are single-channel HDOADMs according to any of the embodiments of FIG. 3a–c. Each of SHDOADMs 502, 504, 506 and 508 is tuned to operate on a different channel. When a SHDOADM is not being tuned and channels are to be add/dropped, its cross-bar switch is set to the cross state. This causes the SHDOADM to drop the input channel to which it is tuned and allows the same channel with different content to be added, as previously described in conjunction with FIG. 3a. The channels to which it is not tuned and the added channel are transmitted through to the next SHDOADM of the cascade. In contrast, when a SHDOADM is being tuned, or channels are not to be add/dropped, the cross bar switch of the SHDOADM is set to the bar state. This results in all of the channels being passed to the next SHDOADM in the cascade.

For example, a WDM signal comprising channels A, B, C, D, and E are input via the In port of four-channel HDOADM 500. SHDOADM 502 is tuned to channel A, SHDOADM 504 is tuned to channel B, SHDOADM 506 is tuned to channel C and SHDOADM 508 is tuned to channel D. It is desired to drop channel A in the input WDM signal, while keeping the B, C, D and E channels. To accomplish this, the cross-bar switch of SHDOADM 502 is placed in the cross state, while the cross-bar switches of the other SHDOADMs are placed in the bar state. As a result, channel A is dropped and is output via the Drop1 port, while channels B, C, D and E are output via the Pass port. When the same channel with different content, A', is to be added, it is input via the Add1 port. SHDOADM 502 then adds channel A' and the signal output via the Pass port contains A', B, C, D and E.

Further, in the case that SHDOADM 502 is to be re-tuned, for example, to channel E, the add/drop function is deactivated by switching the corresponding cross-bar switch of SHDOADM 502 to the bar state. As described above, this prevents SHDOADM 502 from dropping the intermediate channels B, C and D while it is being tuned from operating on channel A to channel E.

FIG. 5b illustrates another embodiment of an exemplary four-channel HDOADM 500. HDOADM 500 is the same except that a 4-port circulator replaces the dual 3-port circulators at the intermediate connections between SHDOADMs 502, 504, 506, and 508.

FIG. 6 illustrates another embodiment of an exemplary four-channel HDOADM 600 formed by a cascade of SHDOADMs according to the present invention. HDOADM 600 is a four-channel HDOADM and is the same as multi-channel HDOADM 500 except that SHDOADMs 602, 604, 606 and 608 are MZI-based SHDOADMs as described in FIG. 4a.

Figure 8:
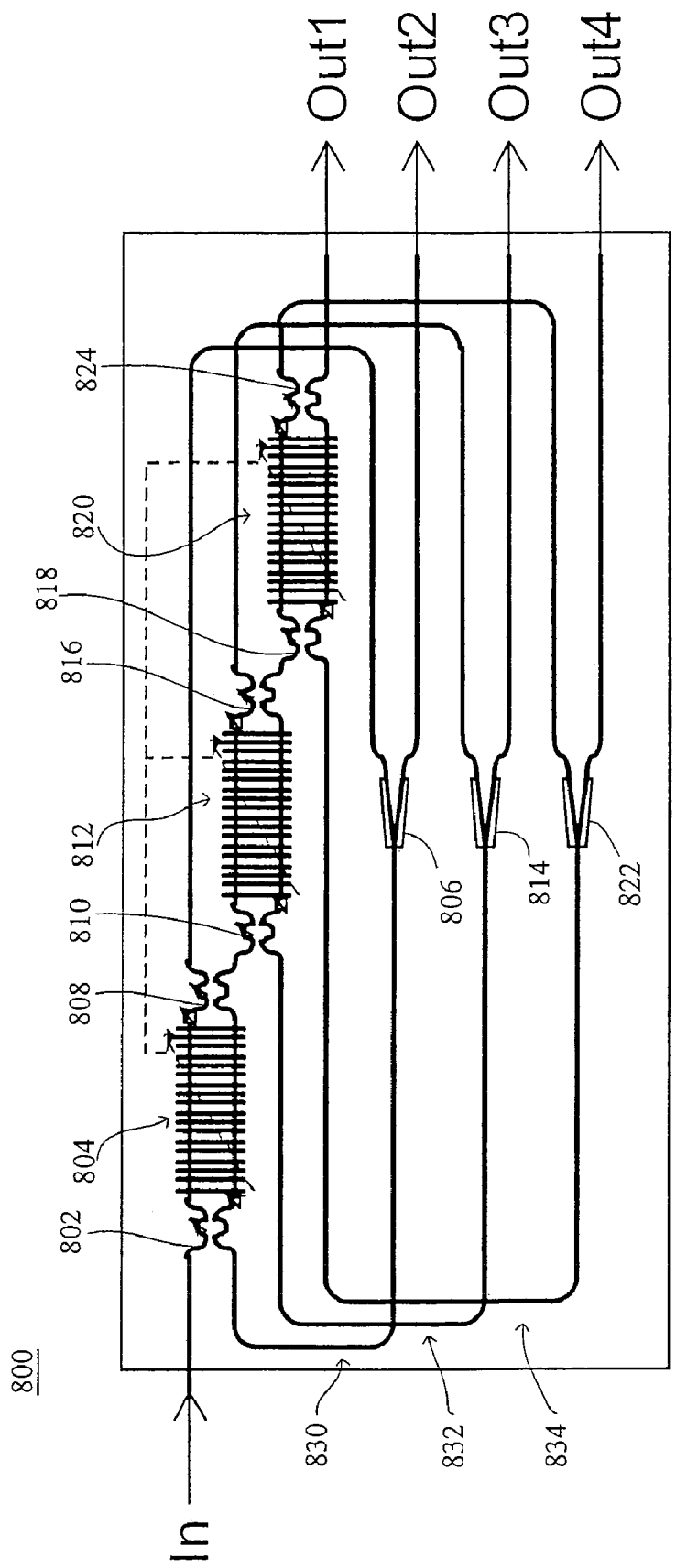

FIGS. 7a–b and 8 illustrate hitless dynamic demultiplexers (HDDEMUXs) according to the present invention. As previously described, generally a DEMUX divides a WDM signal received from a waveguide into its different channels and couples each channel into a different waveguide.

The filters of the device do not have to be tunable since, generally, a DEMUX separates out all of the channels in a system. However, a hitless dynamic DEMUX according to the principles of the present invention is advantageous as it can be used in systems that have the same channel number and channel spacing but varying channel allocations.

In general, an N-channel HDDEMUX according to the principles of the present invention is formed using N-1 tunable reflective filters, such as tunable Bragg gratings, N-1 1×2 switches, and 2(N-1) directive couplers, such as 3-port circulators. During operation, the N-channel HDDEMUX receives a WDM signal that comprises at least the N channels on which the HDDEMUX is designed to operate and divides the N channels into different signals that are each coupled to a waveguide.

FIG. 7a illustrates an exemplary four-channel HDDE-MUX 700 according to the principles of the present invention. As shown, exemplary HDDEMUX 700 is a four-channel HDDEMUX and, consequently, during operation it receives, via the In port, a WDM signal that comprises the four channels on which it is designed to operate (e.g., channels A, B, C and D). HDDEMUX 700 then divides each of the 4 channels on which it is designed to operate into four different signals and outputs each one on a separate one of the outputs Out1, Out2, Out3 and Out4 (e.g., channel A is output via Out1, channel B is output via Out2, channel C is output via Out3 and channel D is output via Out4).

Because HDDEMUX 700 is a 4-channel HDDEMUX, it comprises 3 tunable reflective filters 704, 712 and 720, 3 1×2 switches 706, 714 and 722, and 6 3-port circulators 702, 708, 710, 716, 718 and 724. Circulators 702 and 708, tunable reflective filter 704 and 1×2 switch 706 are arranged in a fashion similar to HDOADM 300 to form a first hitless optical divide module (HODM) 730. HODM 730 operates similar to HDOADM 300. Circulator 702 directs an input signal to reflective filter 704 and reflective filter 704 reflects a channel to which it is tuned back to circulator 702, which then directs the reflected signal to switch 706. When switch 706 is in a first position, the reflected channel is directed out the port Out2. When switch 706 is in the other position, the reflected channel is directed towards circulator 708, which recombines it with the transmitted channels and outputs the WDM signal such that no channels are divided out.

Similarly, circulators 710 and 716, tunable reflective filter 712 and 1×2 switch 714 are arranged to form second HODM 732 which is cascaded with HODM 730 and circulators 718 and 724, tunable reflective filter 720 and 1×2 switch 722 are arranged to form a third HODM 734 which is cascaded with HODM 732. HODM 730 divides out the channel on which it operates (e.g., channel B) and outputs it via the port Out2. HODM 732 divides out the channel on which it operates (e.g., channel C) and outputs it via the port Out3. HODM 734 divides out the channel on which it operates (e.g., channel D) and outputs it via the port Out4. The remaining channel (e.g., channel A) is output via the port Out1.

FIG. 7b illustrates another embodiment of a HDDEMUX 700 in which the intermediate 3-port circulators are replaced with 4-port circulators 708 and 714. Thus, in this embodiment, a single 4-port circulator acts as two directive couplers to provide the 2(N-1) directive couplers.

In another embodiment of an N-channel HDDEMUX according to the principles of the present invention, the N-1 tunable reflective filters are MZI-based reflective filters and the 2(N-1) directive couplers are 3 dB couplers. Thus, in this embodiment, N-1 MZI-based reflective filters, 2(N-1) 3 dB couplers and N-1 1×2 switches are used for an N-channel HDDEMUX. Similar to the embodiment of FIG. 1, the couplers, reflective filters and 1×2 switches are arranged to form cascaded HODMs.

An exemplary 4-channel HDDEMUX 800 according to this embodiment is illustrated in FIG. 8. Couplers 802 and 808, reflective filter 804 and 1×2 switch 806 are arranged to form a first HODM 830. Couplers 810 and 816, reflective filter 812 and 1×2 switch 814 are arranged to form a second HODM 832, which is cascaded with HODM 830. Couplers 818 and 824, reflective filter 820 and 1×2 switch 822 are arranged to form a third HODM 834, which is cascaded with HODM 832. Each HODM 830, 832 and 834 operates in a like manner to the HODMs of the embodiment of FIG. 7a to divide out the channel it is set to operate on from the input WDM signal. As such, 4-channel HDDEMUX 800 functions in the same fashion as 4-channel HDDEMUX 100 to demultiplex 4 channels in a WDM signal.

FIGS. 9a–9c and 10a–10c illustrate M-channel Hitless Dynamic WSSs (HDWSSs) according to the principles of the present invention. As previously described, a WSS provides for selectively switching amongst L WDM signals that have N channels, the contents of any M of the N channels. For example, two WDM signals, $WDM_1$ and $WDM_2$ have N channels each, including channels A and A', respectively. Channels A and A' are the same wavelength in both WDM signals, i.e. they are the same channel, but with different content. A WSS provides for one of two possibilities with respect to channels A and A': (a) the channels are not switched between the WDM signals, such that $WDM_1$ continues to have the content of A and $WDM_2$ continues to have the content of A' (b) the channels are switched between the WDM signals such that $WDM_1$ has the content of A' and $WDM_2$ has the content of A. The same occurs for M-1 more channels.

One embodiment of a HDWSS according to the principles of the present invention uses M tunable reflective filters, such as tunable Bragg gratings, per each one of the L WDM signals, M pairs of directive couplers, such as 3-port optical circulators, per each one of the L WDM signals, and M L×L switches. FIG. 9a illustrates an exemplary HDWSS 900 of this embodiment that switches amongst two WDM signals that have N channels, the contents of any four of the N channels. Consequently, HDWSS 900 comprises 4 tunable reflective filters 906, 920, 934 and 952 for the first WDM signal input via port In1 and 4 tunable reflective filters 908, 922, 936 and 954 for the second WDM signal input via port In2. WSS 900 also comprises 8 3-port circulators 902, 912, 916, 926, 930, 942, 948 and 958 for the first WDM signal, 8 3-port circulators 904, 914, 918, 928, 932, 944, 950 and 960 for the second WDM signal and 4 2×2 switches 910, 924, 940 and 956.

For M-channel HDWSSs of this embodiment, M wavelength switches are formed from the circulators, reflective filters and switches; one for each of the wavelengths in the subset to be switched. These wavelength switches are then placed in cascade. As shown, for four-channel HDWSS 900, there are four wavelength switches 962, 964, 966 and 968 formed from the circulators, filters and switches.

For instance, wavelength switch 962 is formed from tunable reflective filters 906 and 908, 3-port circulators 902, 912, 904 and 912, and 2×2 switch 910. Reflective filter 906 has one of its ends connected to the third port of 3-port circulator 902 and its other end connected to first port of 3-port circulator 912. One of the bar arms of switch 910 is connected between the second ports of circulators 902 and 912. The other bar arm of switch 910 is connected between the second ports of circulators 904 and 914. Reflective filter 908 has one end connected to the third port of circulator 904 and its other end connected to the first port of circulator 914. Reflective filter 908 and 906 are tuned to the same wavelength.

Circulator 902 and reflective filter 906 operates in the same manner as HDOADM 300 to direct the reflected channel that reflective filter 906 is tuned to towards switch 910. When switch 910 is in the bar state, the reflected channel is directed by switch 910 to circulator 912, resulting in it being output with the channels transmitted by reflective filter 906. Correspondingly, the channel reflected by reflective filter 908 is directed by switch 910 to circulator 914, resulting in it being output with the channels transmitted by reflective filter 914.

When switch 910 is in the cross-state, however, the channel reflected by filter 906 is instead directed towards circulator 914, which results in the reflected channel being output with the channels transmitted by reflective filter 908. Correspondingly, the channel reflected by reflective filter 908 is output with the channels transmitted by reflective filter 906.

Therefore, wavelength switch 962 is operative to switch the contents of a channel between two WDM signals. Each of the additional wavelength switches 966, 966 and 968 are formed in a like manner, however, are tuned to a different one of the four channels. Thus, by cascading each of the wavelength switches, the contents of any four out of the N channels carried by the WDM signals input into the In1 port and the In2 port can be switched between the WDM signals. If less than four channels need to be switched, one or more of the wavelength switches are effectively turned off by tuning them so that they filter either between channels or outside the frequency band used (e.g., outside the erbium "C" band).

Tuning the tunable reflective filters of the wavelength switches tunes HDWSS 900 to operate on different channels. Preferably, the tunable filters of a wavelength switch can be tuned simultaneously (indicated by the dashed lines linking the arrows). Further, placing a wavelength switch's corresponding switch in the bar-state operates HDWSS 900 in a hitless manner when that wavelength switch is tuned.

FIG. 9b illustrates another embodiment of a HDWSS 900 except that the intermediate 3-port circulators are replaced with 4-port circulators 912, 922, 932, 914, 924 and 934. Thus, in this embodiment, a HDWSS according to the principles of the present invention is formed using M tunable reflective filters per each one of the L WDM signals, 2 3-port directive couplers, such as 3-port optical circulators, per each one of the L WDM signals, M-1 4-port directive couplers, such as 4-port optical circulators, per each one of the L WDM signals, and M L×L switches.

Figure 9C:
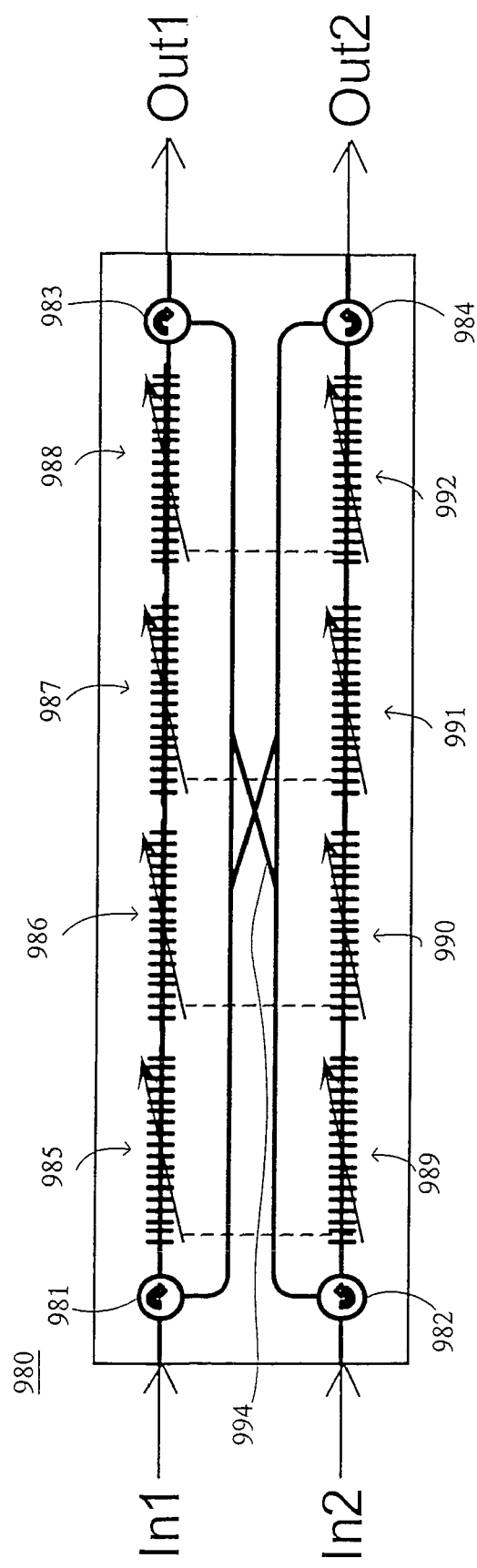

In another embodiment, a HDWSS according to the principles of the present invention is formed using M tunable reflective filters per WDM signal, 2 directive couplers, such as 3-port optical circulators, per WDM signal, and one L×L switch. FIG. 9c illustrates an exemplary HDWSS 900 of this embodiment that switches amongst two WDM signals that have N channels, the contents of four of the N channels. As shown, four tunable reflective filters 906, 986, 987 and 988 are cascaded between a third port of 3-port circulator 981 and a first port of 3-port circulator 983. One of the bar arms of switch 994 is connected between the second ports of circulators 981 and 983. The other bar arm of switch 928 is connected between the second ports of circulators 982 and 984. Four tunable reflective filters 989, 990, 991 and 992 are cascaded between a third port of 3-port circulator 982 and a first port of a 3-port circulator 984. Reflective filter 985 and 989 are tuned to the same channel. Reflective filter 986 and 990 are tuned to the same channel. Reflective filter 987 and 991 are tuned to the same channel. Reflective filter 988 and 992 are tuned to the same channel.

Each of the reflective filters 985, 986, 987 and 988 operate to reflect their respective channel back to circulator 981. Circulator 981 then directs the reflected channels towards switch 994. When switch 994 is in the bar state, the reflected channels are directed by switch 994 to circulator 983, resulting in it being output with the channels transmitted by reflective filters 985, 986, 987 and 988. Correspondingly, the channels reflected by reflective filters 989, 990, 991 and 992 are directed by switch 994 to circulator 984, resulting in them being output With the channels transmitted by reflective filters 989, 990, 991 and 992.

When switch 994 is in the cross-state, however, the channels reflected by filters 985, 986, 987 and 988 are instead directed towards circulator 984, which results in the reflected channels being output with the channels transmitted by reflective filters 989, 990, 991 and 992. Correspondingly, the channels reflected by reflective filters 989, 990, 991 and 992 are output with the channels transmitted by reflective filters 985, 986, 987 and 988.

Therefore, when switch 994 is in the cross-state, HDWSS 900 operates to switch the contents of four of the N channels carried by the WDM signals input into the In1 port and the In2 port between the WDM signals. If less than four channels need to be switched, one or more of the sets of filters tuned to the same channel are effectively turned off by tuning them so that they filter either between channels or outside the frequency band used (e.g., outside the erbium "C" band).

Tuning the reflective filters tunes HDWSS 900 to operate on different channels. Preferably, each one of the tunable filters that are tuned to the same channel (e.g., filters 906 and 908) can be tuned simultaneously (indicated by the dashed lines linking the arrows). Further, placing switch 928 into the bar-state operates HDWSS 900 in a hitless manner when any of the reflective filters is tuned.

Figure 10A:
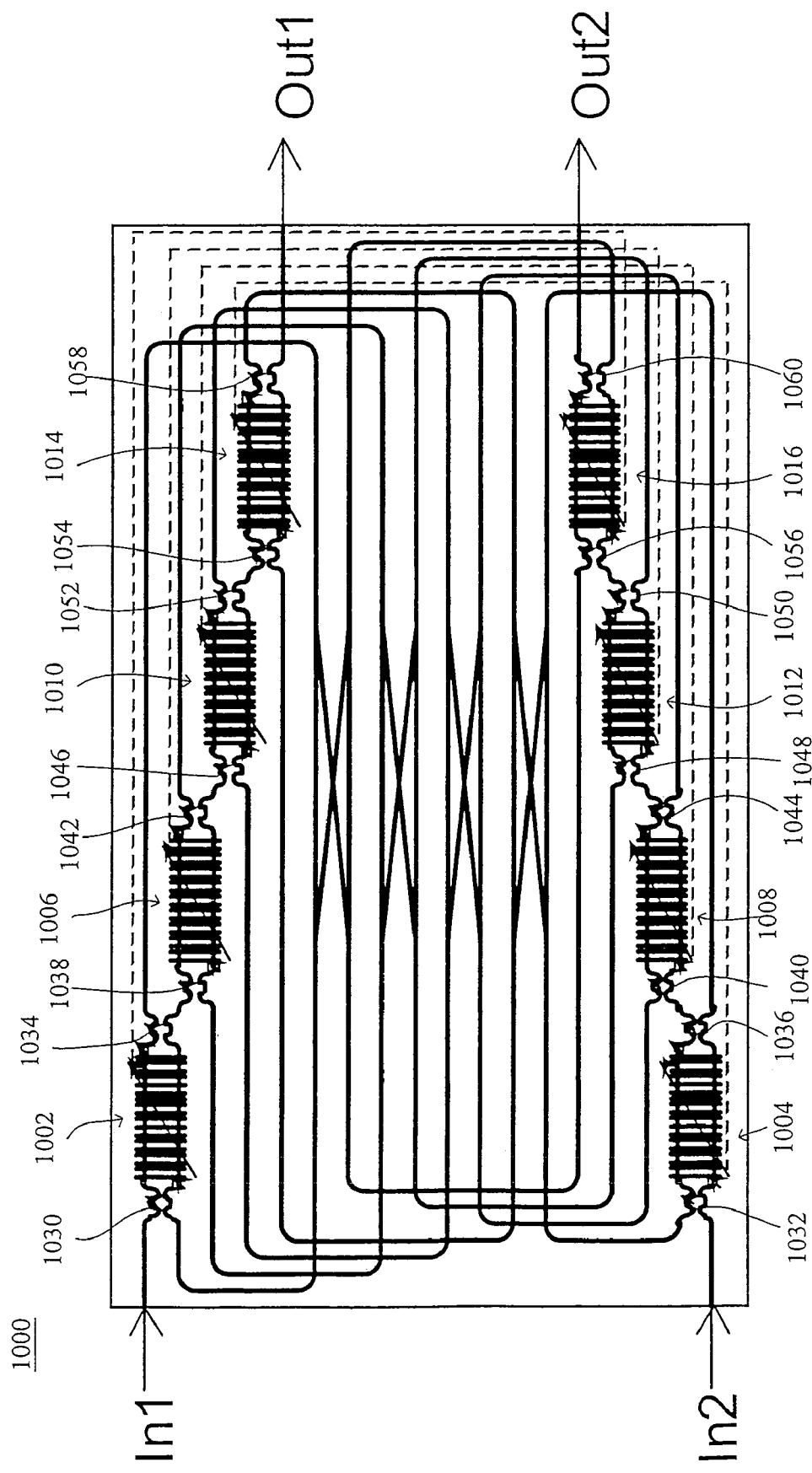

In another embodiment, a HDWSS according to the principles of the present invention is formed using a cascade of M balanced MZI structures per WDM signal and M L×L switches. FIG. 10a illustrates an exemplary HDWSS 1000 of this embodiment that switches amongst two WDM signals that have N channels, the contents of any four of the N channels. As can be seen, this embodiment is similar to the embodiment of FIG. 9a, except the tunable reflective filters 1002, 1006, 1010, 1014, 1004, 1008, 1012 and 1016 are MZI-based reflective filters, i.e. two optical paths with Bragg gratings formed across them, and the directive couplers 1030–1060 are 3 dB couplers. Consequently, HDWSS 1600 operates in the same manner as HDWSS 900.

In another embodiment, a WSS is formed using M cascaded MZI-based filters per WDM signal, 2 3 dB couplers per WDM signal, and one L×L switch. FIG. 10b illustrates an exemplary HDWSS 1080 of this embodiment that switches amongst two WDM signals that have N channels, the contents of four of the N channels. As can be seen, this embodiment is similar to the embodiment of FIG. 9c, except the tunable reflective filters 1085–1092 are MZI-based reflective filters, i.e. two optical paths with Bragg gratings formed across them, and the directive couplers are 3 dB couplers. Consequently, HDWSS 1000 operates in the same manner as HDWSS 980.

In another embodiment, a HDWSS is formed using M cascaded MZI-based filters per WDM signal, 2 3 dB couplers per WDM signal, and one L×L switch, however, the M MZI-based reflective filters are built for all of the WDM signals by forming a single set of tunable Bragg gratings across all of the MZI arms. FIG. 10c illustrates an exemplary HDWSS 1001 of this embodiment that switches amongst two WDM signals that have N channels, the contents of four of the N channels. As can be seen, a first MZI structure (arms 1019 and 3 dB couplers 1003 and 1007) for the first WDM signal is formed alongside a second MZI structure (arms 1021 and 3 dB couplers 1005 and 1009) for the second WDM signal. A single set of four tunable Bragg gratings 1011–1017 are formed across arms 1019 and 1021 to form the four tunable MZI-based filters for the first WDM signal and the four tunable MZI-based filters for the second WDM signal. A 2×2 switch 1023 is connected between the MZI structures in the same manner as switch 1094 of the embodiment of FIG. 9c. HDWSS 1001, thus, operates in the same manner as the embodiment of FIGS. 10b, however, the use of a single set of gratings provides for synchronicity and easier control when tuning the filters.

The embodiments of FIG. 9a–b and FIG. 10a are advantageous in that each filter can be tuned separately without having to bar the switching of the other filters during tuning. Between the embodiments of FIG. 9a and FIG. 9b, the advantage of the FIG. 9a embodiment is that it uses only 3-port circulators, which might be easier to produce than 4-port circulators, and the advantage of the FIG. 9b embodiment is that it uses fewer circulators, which is an advantage when 4-port circulators can be easily produced. The advantage of the FIG. 9c embodiment is that it uses even fewer circulators than the embodiments of FIGS. 9a and 9b, but whenever one filter is being tuned, all the filters must be barred (i.e., no switching).

An OXC provides for selectively switching amongst L WDM signals that have N channels, the contents of any or all of the N channels. Therefore, any of the HDWSS embodiments above can be used as an OXC by making M equal to N.

When used as an OXC, the filters of the device do not have to be tunable since, by definition, the content of all the channels in the system can be switched. However, it is preferable that the filters are tunable so that the OXC can be used in different systems that have the same channel number and channel spacing but different channel allocations. In this case, the tuning elements would typically be set initially for filtering at a specific channel allocation, with no subsequent tuning needed in the system. Since the spacing between the channels remains constant, it is preferable that all the filters are tunable simultaneously, allowing for simpler electronic control of the device. However, it should be noted, that having independent tuning elements might be advantageous as it allows for individual trimming of the filters to compensate for individual characteristics possibly due to fabrication imperfections.

FIGS. 11a–b and 12a–b illustrate single-channel errorless hitless dynamic optical add/drop multiplexers (EH-DOADMs). A hitless dynamic optical add/drop multiplexer is called errorless when the intermediate channels do not experience any significant change in the BER during tuning.

To exemplify this, while the embodiments of FIGS. 3a–c and 4a–b are hitless dynamic OADMs, they are not errorless at high modulation speeds because, during the short time when the filter's edge is going through the signal spike of a channel, part of the signal goes straight through the filter to the pass port and part of the signal is dropped/added then goes through the pass port. When the modulation speed is low enough, the two segments of the signal rejoin relatively in sync, causing some broadening that affects the SNR (signal-to-noise ratio) and the duty cycle. When the modulation speed is high, the delayed segment of the signal joins the straight-through segment with a large delay, causing the delayed part of a bit to join a non-corresponding bit on the straight-through path, which typically (a) lowers the SNR when the reflected segment is weaker than the straight-through segment, (b) destroys the signal when the reflected segment and the straight-through segment have competing intensities, or (c) causes bit sequence destruction when the reflected segment is stronger than the straight-through segment. All of these effects result in a poorer BER (bit error rate) during the short time when the filter edge is going through the signal spike of a channel. Also, because the cross-bar switches do not switch instantaneously, errors result during the switching performed for tuning.

It is desirable to have an errorless hitless dynamic OADM, i.e. one in which none of the intermediate channels experiences any significant change in the BER during tuning. This effect is achieved by having a bypass path for the entire WDM signal and establishing a balanced MZI during the time when switching is occurring between the filter path and the bypass path.

Figure 11A:
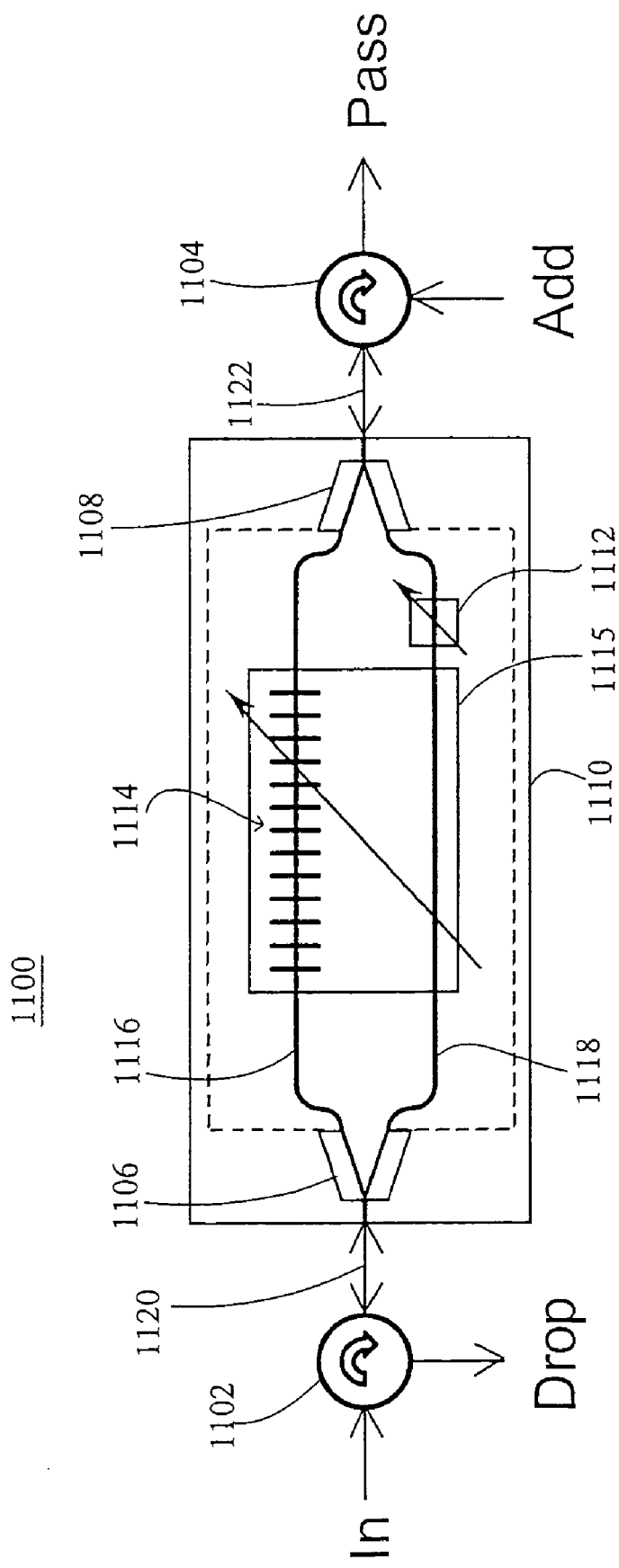

One embodiment which achieves this functionality is illustrated in FIG. 11a. In this embodiment, a EHDOADM 1100 comprises two 3-port optical circulators 1102 and 1104, two opposed 1×2 switches 1106 and 1108, with the 2-port sides facing, and a filter path 1116 and bypass path 1118, connected between switches 1108 and 1106. A port 1120 of circulator 1102 is connected to the single-port side of switch 1106. Likewise, a port 1122 of circulator 1104 is connected to the single-port side of switch 1108. Filter path 1114 comprises a tunable reflective filter 1114, such as a Bragg grating, which is tuned by an appropriate means, such as heater 1115. Bypass path 1118 is simultaneously tuned by heater 1114. A phase shifter 1112 is used to trim path 1118 so that a balanced MZI configuration is maintained. In the embodiment of FIG. 11a, all of the components except for circulators 1104 and 1102 are integrated on a single substrate 1110.

During operation, a WDM signal comprising a plurality of channels (e.g., channel A, B, C and D) is input to circulator 1102 via the In port. This WDM signal is output to switch 1106 by port 1120. When channels are being added and/or dropped, switches 1106 and 1108 are set so that the signals travel along filter path 1116. The WDM signal, therefore, follows this path. Filter 1114 reflects the channel to which it is tuned (e.g., channel A) back to switch 1106, while allowing the rest of the channels (e.g., B, C and D) to pass through. The channels that are passed through are directed by switch 1108 to circulator 1104 via port 1122. The passed through channels exit out of the Pass output of circulator 1104. The reflected channel is directed by switch 1106 back to circulator 1102, which outputs it via the Drop port.

The same channel as the one dropped with different content (e.g., A') can be added by inputting it into the Add port of circulator 1104. The added channel is output from circulator 1104 via port 1122 to switch 1108. Switch 1108 directs the added channel along filter path 1116. Because the added channel is the same one that filter 1114 is tuned to, filter 1114 reflects it back to through switch 1108 to port 1122 of circulator 1104. Circulator 1104 then outputs it out the Pass port such that a WDM signal comprising the passed through channels and the added channel (e.g., channels A', B, C and D) is output by EHDOADM 1100.

When tunable filter 1114 is to be tuned to operate on another channel, switches 1106 and 1108 are switched to direct signals along bypass path 1118. The arrangement of the two paths 1116 and 1118 and switches 1106 and 1108 establishes a balanced MZI during the time when switching is occurring between the filter path 1116 and the bypass path 1118. This prevents errors resulting from switching. Further, by directing all of the channels through bypass path 1118 during tuning of filter 1114, filter 1114 does not operate on any of the channels while it is being tuned, which prevents problems resulting from segments of the WDM signal being delayed relative to the other segments during tuning.

Generally, switches 1106 and 1108 are required to switch substantially simultaneously for proper operation of EHDOADM 1100. Since there is a need to simultaneously switch switches 1106 and 1108, corresponding switch electrodes of each switch 1106 and 1108 are preferably connected for synchronicity and/or easier electronic control of the device. This is illustrated by the dashed lines linking the switch electrodes.

A device that is fully integrated on a single chip is less likely to have transient and synchronicity issues. As such, an alternative to the embodiment of FIG. 11a has the circulators additionally integrated on the same substrate. This is illustrated in FIG. 11b. As shown, the embodiment of FIG. 11a is the same as that of FIG. 11b, except for the integration of circulators 1102 and 1104 on substrate 1110. Integrated circulators 1102 and 1104 are based, for example, on planar MZIs using either polarization splitting and nonreciprocal polarization conversion, or nonreciprocal phase shift within the interferometric arm.

Another integrated design uses an MZI-based design for the filter path. This is illustrated in FIG. 12a. EHDOADM 1200 comprises two opposed 1×2 switches 1206 and 1208 having the 2-port sides facing with a filter path 1216 and bypass path 1218 connected therebetween. Filter path 1216 comprises two optical paths with Bragg gratings formed across them 1206 and two 3 dB couplers 1202 and 1204. This forms a balanced MZI structure with substantially identical Bragg gratings in the two MZI arms. Filter path 1216 is connected between switches 1206 and 1208 by one port of 3 dB coupler 1202 connected to switch 1206 and one port of 3 dB coupler 1204 connected to switch 1208. The second port of 3 dB coupler 1202 outputs the dropped channel. Similarly, the other port of 3 dB coupler 1204 is used as an input port to input add channels. The single-port side of switch 1206 is used as the In port and the single-port side of switch 1208 is the Pass port. The Bragg gratings act as a tunable reflective filter, which is tuned by, for example, heater 1214. Bypass path 1218 is simultaneously tuned by heater 1214. Switch electrodes of each switch 1206 and 1208 are preferably connected for synchronicity and/or easier electronic control of the device as they are in EHDOADM 1100. This is similarly illustrated by the dashed lines linking the switch electrodes.

EHDOADM 1200 operates similarly to EHDOADM 1100. During operation, a WDM signal comprising a plurality of channels (e.g., channel A, B, C and D) is input via the In port. When channels are being added and/or dropped, switches 1206 and 1208 are set so that the signals travel along filter path 1216. The WDM signal, therefore, follows this path. As such, the WDM signal input coupler 1202 by switch 1206. Coupler 1202 splits the input power of the WDM signal evenly into the two MZI arms. The Bragg gratings in the two MZI arms reflect the channel they are tuned to (e.g., channel A) back into coupler 1202, while allowing the rest of the channels (e.g., B, C and D) to be transmitted through. The optical signal carrying the transmitted channels merges in second coupler 1204. When the optical paths are balanced, the optical signal of the transmitted channels is transferred to switch 1208 and are output via the Pass port. The optical signal of the reflected channel merges in first coupler 1202. Like the transmitted channels, the optical signal of the reflected channel is carried out the Drop port, with little leakage to the port connected to switch 1206.

The same channel as the one dropped with different content (e.g., A') can be added by inputting it into coupler 1204 by the Add port. Coupler 1204 splits the input power of the added channel evenly into the two MZI arms. The Bragg gratings in the two MZI arms reflect the added channel back into coupler 1204. The optical signal of the add channel is then transferred by coupler 1204 to switch 1208 such that a WDM signal comprising the passed through channels and the added channel (e.g., channels A', B, C and D) is output via the Pass port.

Like EHDOADM 1100, when the tunable filter is to be tuned to operate on another channel, switches 1206 and 1208 are switched to direct signals along bypass path 1218. The arrangement of the two paths 1216 and 1218 and switches 1206 and 1208 also establishes a balanced MZI during the time when switching is occurring between the filter path 1216 and the bypass path 1218, which prevents errors resulting from switching. Further, by directing all of the channels through bypass path 1218 during tuning likewise prevents problems resulting from segments of the WDM signal being delayed relative to the other segments.

Figure 12B:
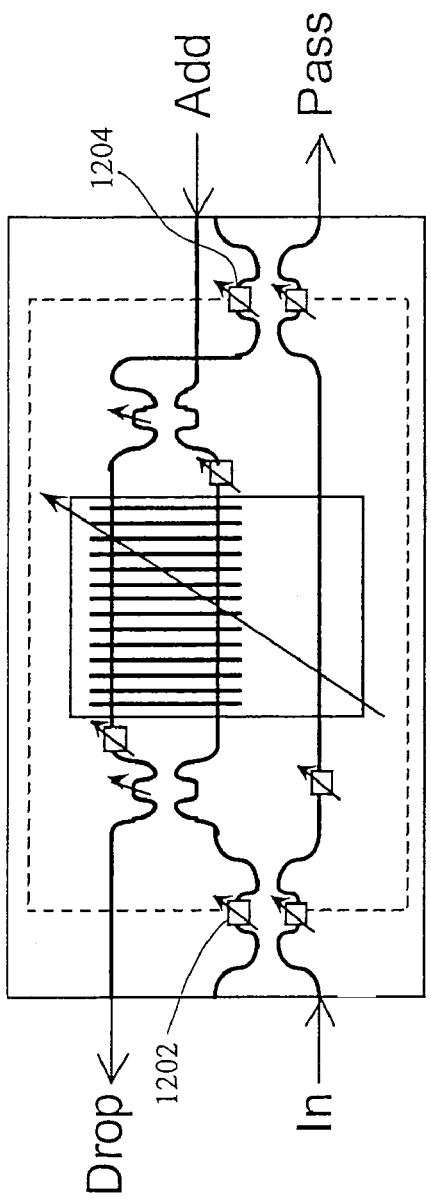

While thermo-optic 1×2 digital optical switches (DOS) have been illustrated, MMI-based or MZI-based 1×2 switches can also be used. The use of MZI-based 1×2 switches is illustrated in FIG. 12b. The embodiment of FIG. 12b is the same, except the 1×2 DOS thermo-optic switches have been replaced by MZI 1×2 switches 1202 and 1204. MMI-based and MZI-based 1×2 switches can also be used in place of the 1×2 DOS thermo-optic switches in the embodiments of FIGS. 11a–b.

Figure 13A:
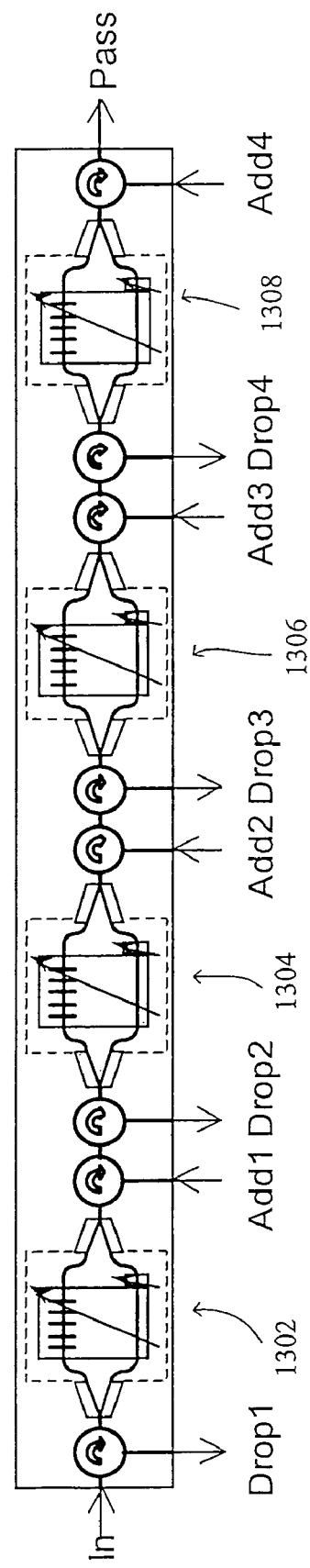

Similar to the multi-channel HDOADM formed from the single channel HDOADMs, multi-channel EHDOADMs can be formed by cascading multiple single-channel EHDOADMs. FIG. 13a illustrates one embodiment of an exemplary four-channel HEDOADM 1300 formed using a cascade of single-channel EHDOADMs 1302, 1304, 1306, 1308 according to the embodiment of FIG. 11a. Each single-channel EHDOADMs 1302, 1304, 1306, 1308 is tuned to operate on a different channel. When a single-channel EHDOADM is not being tuned and channels are to be add/dropped, its switches are set to direct signals along the filter path. This causes the EHDOADM to drop the input channel to which it is tuned and allows the same channel with different content to be added, as previously described in conjunction with FIG. 11a. The channels to which it is not tuned and the added channel are transmitted through to the next EHDOADM of the cascade. In contrast, when a EHDOADM is being tuned, or channels are not to be add/dropped, the switches are set to direct signals along the bypass path. This results in all of the channels being passed to the next EHDOADM in the cascade.

FIG. 13b illustrates another embodiment of exemplary four-channel EHDOADM 1300 formed by a cascade of single-channel EHDOADM according to the embodiment of FIG. 11b. As shown, a 4-port circulator replaces the dual 3-port circulators at the intermediate connections between each single-channel EHDOADM 1302, 1304, 1306 and 1308.

FIG. 14 illustrates another embodiment of an exemplary four-channel EHDOADM 1400 formed by a cascade of single-channel EHDOADM according to the embodiment of FIG. 12a. HDOADM 1400 is a four-channel HDOADM and is the same as multi-channel HDOADM 1300 except that single-channel EHDOADM 1402, 1404, 1406 and 1408 are MZI-based EHDOADMs as described in FIG. 12a.

Polarization independent EHDOADMs can be formed from EHDOADMs according to the present invention. Sometimes, tunable reflective filters operate slightly different on light depending upon the light's polarization state, i.e. they have polarization dependent behavior. Because of this behavior, difficulties can occur when a reflective filter is used to operate on light consisting of more than one polarization state. An EHDOADM that is polarization dependent, however, can be formed using polarization mode splitters/combiners with two EHDOADMs of the present invention. Generally, a polarization splitter is used to split incoming light signals into their two orthogonal components, the transverse electric (TE) and the transverse magnetic (TM) polarizations. Separate EHDOADMs are then used to operate on these two polarized signals. After the EHDOADMs operate on these polarized signals, the signals are recombined by the polarization combiners for output.

Figure 15:
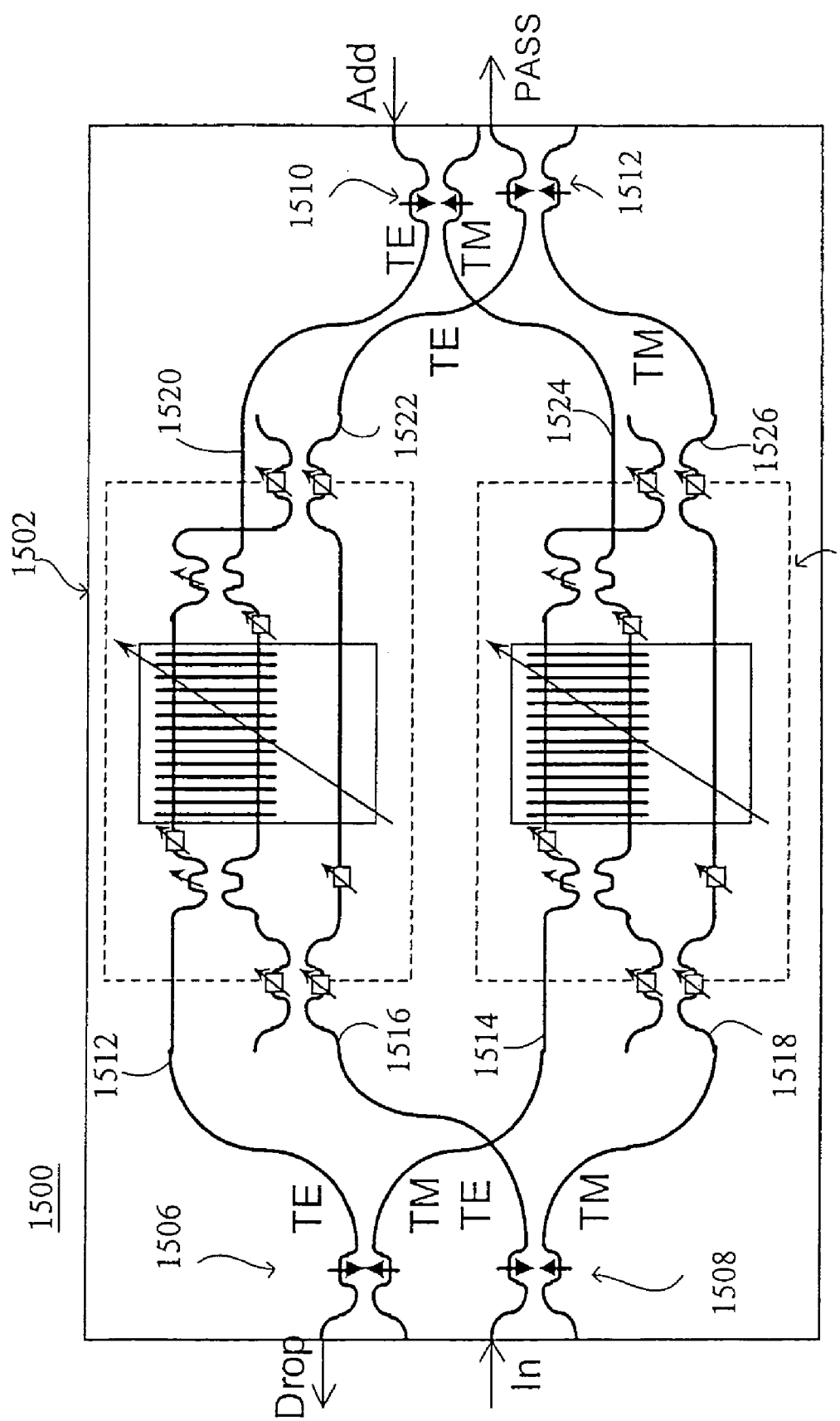
FIG. 15 illustrates a polarization independent errorless hitless dynamic demultiplexer according to the present invention.

A polarization independent EHDOADM 1500 formed, for example, from two EHDOADMs according to the embodiment of FIG. 12b is illustrated in FIG. 15. As illustrated, a polarization splitter 1508 is connected between the input ports of a first EHDOADM 1502 and a second EHDOADM 1504. As shown, polarization splitter 1508 has one of its outputs connected to the input port 1516 of first EHDOADM 1502 and its other output connected to the input port 1518 of second EHDOADM 1504. The input port of polarization splitter 1508 is used as the In port of polarization independent EHDOADM 1500. Similarly, a polarization splitter 1510 is connected between the add ports of first and second EHDOADMs 1502 and 1504. Polarization splitter 1510 has one of its outputs connected to the add port 1522 of first EHDOADM 1502 and its other output is connected to the add port 1524 of second EHDOADM 1504. The input port of polarization splitter 1510 is used as the Add port of polarization independent EHDOADM 1500.

A polarization combiner 1506 is connected between the drop ports of first and second EHDOADMs 1502 and 1504. As shown, polarization combiner 1506 has one of its inputs connected to the drop port 1512 of first EHDOADM 1502 and its other input connected to the drop port of second EHDOADM 1504. The output of polarization combiner 1506 is used as the Drop port for polarization independent EHDOADM 1500. Similarly, a polarization combiner 1512 is connected between the pass ports of first and second EHDOADMs 1502 and 1504. Polarization combiner 1512 has one of its inputs connected to the pass port 1522 of first EHDOADM 1502 and its other input connected to the pass port of second EHDOADM 1504. The output of polarization combiner 1512 is used as the Pass port for polarization independent EHDOADM 1500.

Both EHDOADMs 1502 and 1504 are tuned to operate on the same channel. Thus, when a WDM signal is input the In port of EHDOADM 1500, it is split into two orthogonally polarized signals carrying the channels. One polarized signal is input to first EHDOADM 1502 via port 1516, while the other polarized signal is input to second EHDOADM 1504 via port 1518. Each EHDOADM 1502 and 1504 operates on its respective signal. When EHDOADMs 1502 and 1504 are not being tuned and channels are to be add/dropped, each EHDOADM's switches are set so that signals are directed signals along the filter path. Each EHDOADM 1502 and 1504 drops the tuned input channel from its polarized signal. First EHDOADM-1502 drops the tuned input channel via port 1512 and second EHDOADM drops the tuned input channel via port 1518. Polarization combiner combines the signals carrying the dropped channel and outputs it via the Drop port. The channels to which EHDOADMs 1502 and 1504 are not tuned are transmitted through to polarization combiner 1512, which combines the signals carrying these channels, and outputs them via the Pass port.

An add channel is input the Add port and split into two orthogonally polarized signals by polarization splitter 1510. Each polarized signal is input into a EHDOADM and reflected back to polarization combiner 1512. The two polarized signals containing the add channel are combined and output via the Pass port.

When the EHDOADMs 1502 and 1504 are being tuned, or channels are not to be add/dropped, the switches are set to direct signals along the bypass path. This results in all of the channels being passed from the In port to the Pass port.

Figure 16:
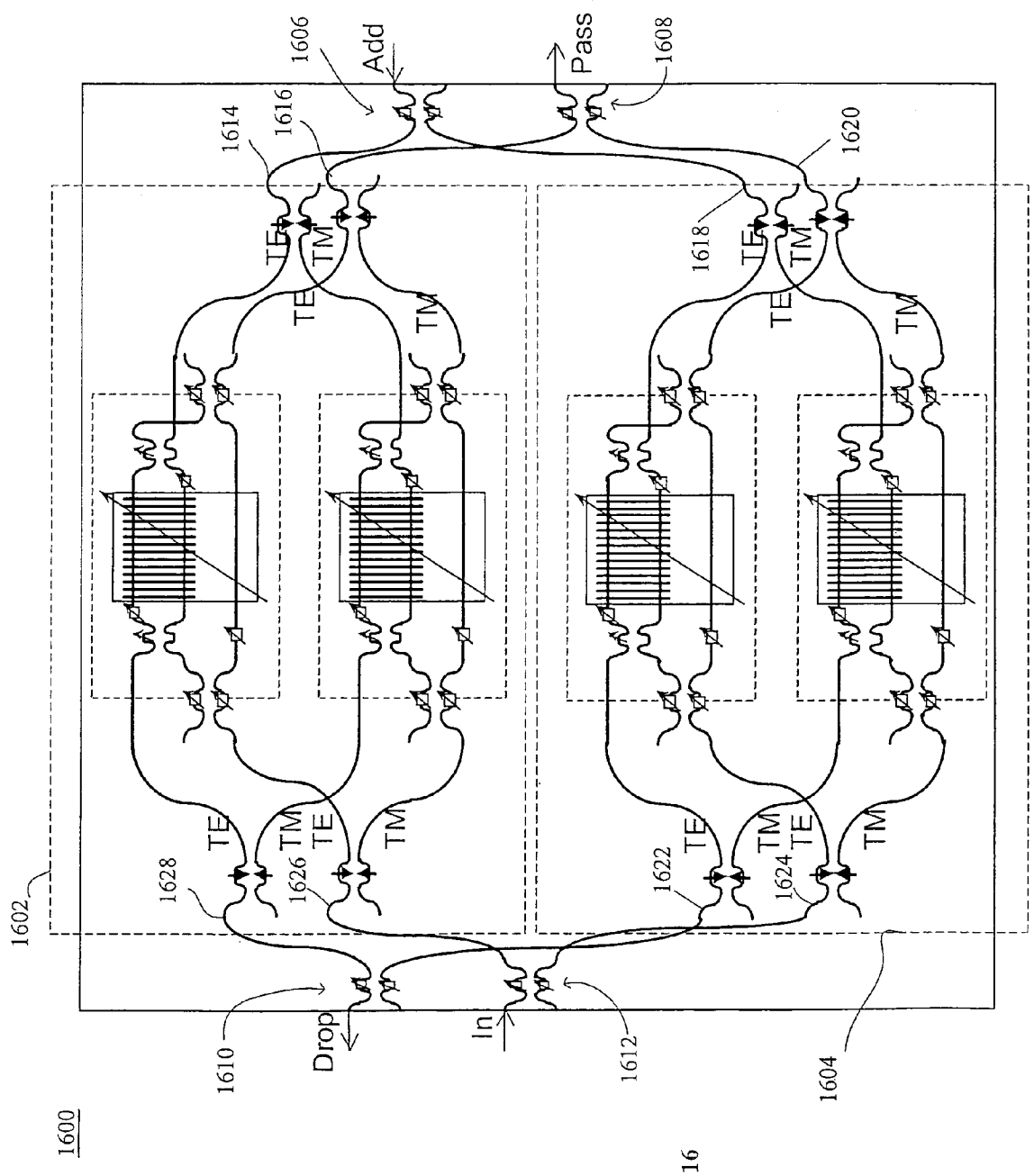
FIG. 16 illustrates a multi-stage polarization independent errorless hitless dynamic demultiplexer according to the present invention.

FIG. 16 illustrates a multi-stage polarization independent EHDOADM 1600. At times, tunable reflective filters only have a dynamic range over a portion of the spectrum of the WDM signal. For instance, some tunable reflective filters only have a dynamic range over half of the Erbium C band. By using 1×2 switches and multiple EHDOADMs, a multi-stage polarization independent EHDOADM 1600 that operates over the entire Erbium C band can be formed. As shown, a first EHDOADM 1602 has its add port 1614 connected to one port of the two-port side of 1×2 switch 1606. A second EHDOADM 1604 has its add port 1618 connected to the other port of the two-port side of switch 1606. The port on the one-port side of switch 1606 is then used as the Add port for the multi-stage EHDOADM 1600. Similarly, 1×2 switch 1608 is connected to the pass ports 1616 and 1620, switch 1610 is connected to drop ports 1622 and 1628, and switch 1612 is connected to in ports 1624 and 1626. EHDOADMs 1602 and 1604 operate as described in conjunction with FIG. 15. Signals over one half of the spectrum are routed by 1×2 switches 1606, 1608, 1610, and 1612 so as to be operated on by first EHDOADM 1602, while the other half is routed by the 1×2 switches 1606, 1608, 1610, and 1612 so as to be operated on by second EHDOADM 1604.

Although the present invention has been shown and described with respect to several preferred embodiments thereof, various changes, omissions and additions to the form and detail thereof, may be made therein, without departing from the spirit and scope of the invention. For instance, in all of the embodiments, the tuning and switching can be performed using any known actuation method, such as thermo-optic, electro-optic, magneto-optic or stress-optic tuning, or any combination thereof. Couplers can take any form including directional couplers, MMI couplers, or MZI couplers and can be tunable (for trimming) or non-tunable. MZI couplers can be symmetric or asymmetric. MMI couplers can have any shape including rectangular and tapered (e.g., parabolic). Tunability as illustrated by arrows, and connections indicating simultaneous actuation of elements as illustrated by dashed lines, can be used or not. Reflective filters can be used in place of 180° bends. Switches can be based on any design including digital optical switches (based on Y-branches, X-junctions or other structures), MMIs, or MZIs. MZIs include Generalized MZIs (GMZIs), which consist of a pair of cascaded MMI couplers with thermal phase shifters on the connecting arms. Switches can be single-stage or multi-stage. Further, DEMUXs can be used as MUXs by using the input ports as output ports and the output ports as input ports.

What is claimed is:

1. A hitless dynamic add/drop multiplexer comprising a continuously tunable reflective filter disposed within an optical waveguide segment, said optical waveguide segment having a first end and a second end, an optical circulator or optical coupler disposed at each end of said optical waveguide segment and optically coupled thereto, and at least one by-pass waveguide coupled to said waveguide segment by an optical switching means.

2. The optical signal processing device of claim 1 wherein said optical circulator or optical coupler is an optical circulator disposed at each said end of said waveguide segment and optically coupled thereto to form an optical circuit element.

3. The hitless dynamic add/drop multiplexer of claim 1 further comprising at least one phase shifter disposed to balance the phase difference between the signals in said optical waveguide segment and said by-pass waveguide.

4. The hitless dynamic add/drop multiplexer of claim 1 wherein said optical switching means is selected from the group consisting of Y-branch switches, X-junction switches, directional coupler switches, Mach-Zehnder switches, and multimode interference switches.

5. The hitless dynamic add/drop multiplexer of claim 1 further comprising a substrate upon which is disposed a plurality of components of said hitless dynamic add/drop multiplexers.

6. The hitless dynamic add/drop multiplexer of claim 1 further comprising a second said optical waveguide segment having a continuously tunable reflective filter disposed therewithin, and wherein said optical circulator or optical coupler is a two-port by two-port optical coupler disposed at each end of said two optical waveguide segments, two ports of each said optical coupler being respectively coupled to the first said end of each said waveguide segment and the second said end of each said waveguide segment.

7. The hitless dynamic add/drop multiplexer of claim 6 wherein said optical coupler is selected from the group consisting of directional couplers, multimode interference couplers, and Mach-Zehnder interferometers.

8. The hitless dynamic add/drop multiplexer of claim 6 wherein said optical coupler is tunable.

9. The hitless dynamic add/drop multiplexer of claim 2 or claim 6 further comprising a cross-bar switch and wherein at least two said circuit elements are connected by said cross-bar switch.

10. The optical signal processing device of claim 2 or claim 6 wherein at least two said circuit elements are disposed in parallel and further comprises polarization beam splitters disposed to send the two orthogonal polarizations of an incoming optical signal to the first end of each said waveguide segment as an input, and further comprise polarization beam combiners disposed to collect the two orthogonal polarizations at the second end of each said waveguide segment as an output.

11. The optical signal processing device of claim 2 or claim 6 further comprising a 1×2 switch whereof one port in said optical circulator or coupler disposed at said first end or ends of said waveguide segment or segments, employed as an input end, is connected to the input port of said 1×2 switch, and one port in the optical circulator or coupler disposed at said second end or ends of said waveguide segment or segments, employed as an output end, is connected to an output port of said 1×2 switch.

* * * * *